(12) United States Patent
Tabata et al.

(10) Patent No.: US 7,766,778 B2
(45) Date of Patent: Aug. 3, 2010

(54) DRIVE DEVICE FOR VEHICLE

(75) Inventors: Atsushi Tabata, Okazaki (JP); Yutaka Taga, Aichi-gun (JP); Terufumi Miyazaki, Toyota (JP); Ryuji Ibaraki, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 502 days.

(21) Appl. No.: 11/575,101

(22) PCT Filed: Sep. 13, 2005

(86) PCT No.: PCT/JP2005/017239

§ 371 (c)(1),
(2), (4) Date: Mar. 12, 2007

(87) PCT Pub. No.: WO2006/030948

PCT Pub. Date: Mar. 23, 2006

(65) Prior Publication Data

US 2007/0225098 A1 Sep. 27, 2007

(30) Foreign Application Priority Data

| Sep. 14, 2004 | (JP) | 2004-266293 |
| Sep. 27, 2004 | (JP) | 2004-280652 |
| Dec. 21, 2004 | (JP) | 2004-370039 |
| Jan. 12, 2005 | (JP) | 2005-004977 |

(51) Int. Cl.
*F16H 3/72* (2006.01)
*F16H 37/06* (2006.01)
*B60K 6/42* (2007.10)
*B60K 6/445* (2007.10)
*B60K 1/00* (2007.10)

(52) U.S. Cl. .......... 475/5; 903/911; 903/951; 180/65.22; 180/65.235; 180/65.7

(58) Field of Classification Search .......... 475/5; 74/600 R; 180/65.21, 65.6, 65.7, 65.22, 180/65.235; 903/909, 911, 951
See application file for complete search history.

(56) References Cited

U.S. PATENT DOCUMENTS 3,861,484 A    1/1975   Joslin (Continued)

FOREIGN PATENT DOCUMENTS

DE           199 16 489       10/2000

(Continued)

OTHER PUBLICATIONS translation of IDS reference JP2003336725.*

*Primary Examiner*—Tisha D Lewis
(74) *Attorney, Agent, or Firm*—Oblon, Spivak, McClelland, Maier & Neustadt, L.L.P.

(57) ABSTRACT

A vehicular drive system which includes a first electric motor, a power distributing mechanism (first gear device), a second electric motor, and a step-variable automatic transmission (second gear device), and in which the first electric motor and the power distributing mechanism constitute a first unit, while the second electric motor and the automatic transmission constitute a second unit, and wherein the power distributing mechanism has an output shaft, and the automatic transmission has an input shaft which is connected to the output shaft, whereby a drive force can be transmitted between the first unit and the second unit. The individually prepared first unit and the second unit are assembled together into the vehicular drive system such that the output shaft of the power distributing mechanism and the input shaft of the automatic transmission are connected to each other. Accordingly, the drive system has an improved efficiency of assembling.

9 Claims, 18 Drawing Sheets

U.S. PATENT DOCUMENTS

| | | | |
|---|---|---|---|
| 5,372,213 A * | 12/1994 | Hasebe et al. | 180/65.6 |
| 6,059,059 A | 5/2000 | Schmidt-Brucken | |
| 6,155,364 A | 12/2000 | Nagano et al. | |
| 6,190,283 B1 | 2/2001 | Uchida | |
| 6,455,947 B1 | 9/2002 | Lilley et al. | |
| 6,554,088 B2 | 4/2003 | Severinsky et al. | |
| 6,579,201 B2 | 6/2003 | Bowen | |
| 6,592,484 B1 | 7/2003 | Tsai et al. | |
| 6,729,456 B2 | 5/2004 | Beneton et al. | |
| 6,886,648 B1 | 5/2005 | Hata et al. | |
| 7,223,200 B2 * | 5/2007 | Kojima et al. | 477/3 |
| 7,239,033 B2 * | 7/2007 | Motoike et al. | 290/40 C |
| 7,393,296 B2 | 7/2008 | Kano et al. | |
| 7,582,980 B2 | 9/2009 | Motoike et al. | |
| 2003/0064846 A1 | 4/2003 | Klemen et al. | |
| 2003/0102174 A1 | 6/2003 | Bordini | |
| 2004/0242362 A1 * | 12/2004 | Majalahti | 475/149 |
| 2005/0209760 A1 | 9/2005 | Tabata et al. | |

FOREIGN PATENT DOCUMENTS

| | | |
|---|---|---|
| DE | 103 14 182 | 11/2003 |
| JP | 6 144020 | 5/1994 |
| JP | 9 226392 | 9/1997 |
| JP | 9 226393 | 9/1997 |
| JP | 10 58990 | 3/1998 |
| JP | 2000 85387 | 3/2000 |
| JP | 2000-190749 | 7/2000 |
| JP | 2000 224813 | 8/2000 |
| JP | 2000 346187 | 12/2000 |
| JP | 2001-47882 | 2/2001 |
| JP | 2003 130202 | 5/2003 |
| JP | 2003 191759 | 7/2003 |
| JP | 2003 191761 | 7/2003 |
| JP | 3454036 | 7/2003 |
| JP | 2003 291659 | 10/2003 |
| JP | 2003 336725 | 11/2003 |
| JP | 2004 58921 | 2/2004 |
| JP | 2004 66898 | 3/2004 |
| JP | 2004 99030 | 4/2004 |
| JP | 2004-116735 | 4/2004 |
| JP | 2004 161162 | 6/2004 |
| JP | 2004-204995 | 7/2004 |
| JP | 2004 222439 | 8/2004 |
| JP | 2004 254468 | 9/2004 |
| JP | 2005-206136 | 8/2005 |
| WO | WO 03/055709 | 7/2003 |
| WO | WO 2005/000619 A1 | 1/2005 |

* cited by examiner

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | SPREAD 4.76 |
| R | | | ○ | | | | ○ | 3.209 | |
| N | ○ | | | | | | | | |

○ ENGAGED
◎ ENGAGED FOR STEP-VARIABLE SHIFTING, AND RELEASED FOR CONTINUOUSLY-VARIABLE SHIFTING

DRIVE DEVICE FOR VEHICLE

TECHNICAL FIELD

The present invention relates to a vehicular drive system, and more particularly to techniques for improving the efficiency of assembling of a drive system including electric motors and gear devices, techniques for reducing the weight of the drive system, a drive system including a differential mechanism configured to distribute an output of a drive power source to the electric motor and a power transmitting member, and a shaft supporting structure of the drive system including the differential mechanism.

BACKGROUND ART

There is known a drive system including a first electric motor, a first gear device, a second electric motor and a second gear device. Patent Documents 1-3 disclose such a drive system for a hybrid vehicle. For example, the drive system disclosed in Patent Document 1 includes, as the first gear device, a planetary gear device functioning as a power distributing mechanism. The planetary gear set is configured to distribute a drive force produced by an engine to the first electric motor and the second gear device. The second gear device includes a planetary gear device functioning as a speed reducing mechanism to reduce the speed of a rotary motion and transmit the rotary motion to drive wheels. The first electric motor functions primarily as an electric generator, while the second electric motor functions primarily as an electric motor used as a drive power source in addition to the engine, to produce an assisting drive force for driving the drive wheels.

In the drive system of Patent Document 1, the casing structure consists of a first casing, a second casing and a third casing. The first casing accommodates the first electric motor and the first gear device, and the second casing accommodates the second electric motor, while the third casing accommodates the second gear device. In assembling the drive system thus constructed, a first unit is prepared by accommodating the first electric motor and the first gear device in the first casing, a second unit is prepared by accommodating the second electric motor in the second casing, and a third unit is prepared by accommodating the second gear device in the third casing. The first, second and third units are then assembled together such that the first and third units are disposed on the respective opposite sides of the second unit, Patent Document 1: JP-2003-191759 A
Patent Document 2: JP-2003-191761 A
Patent Document 3: JP-2003-336725 A The drive system of Patent Document 1 manufactured by assembling the three separate units such that the first and third units are disposed on the opposite sides of the intermediate second unit suffers from a problem of a low efficiency of assembling due to a relatively large number of structural divisions of the drive system.

A first aspect of this invention was made in view of the background art described above. It is therefore an object of the invention to provide a vehicular drive system which has an improved efficiency of assembling.

The vehicular drive system disclosed in Patent Document 1 includes an output shaft, and bearings for rotatably supporting the output shaft. The drive system of Patent Document 1, which is a drive system for a hybrid vehicle, includes the first electric motor, the planetary gear device functioning as the power distributing mechanism for distributing the output of the engine to the first electric motor and the output shaft, the second electric motor connected to an output shaft of the power distributing mechanism, and the planetary gear device which connects a rotor support shaft of the second electric motor and the output shaft of the drive system. The output shaft of the drive system is rotatably supported by the casing via the bearings.

The drive system installed on the vehicle is preferably made as light as possible. On the other hand, support members such as the bearings for supporting the output shaft must be lubricated with a lubricating oil. The lubricating oil supplied to the support member must be discharged through a suitable discharging oil passage system. The provision of an exclusive member to provide the discharging oil passage system is contrary to the above-indicated need for reducing the weight of the drive system. Even if the discharging oil passage system is formed without the provision of the exclusive member, the need for minimizing the weight of the drive system still exists.

A second aspect of this invention was made in view of the background art described above. It is therefore an object of the present invention to provide a vehicular drive system which is constructed to have a reduced weight.

There is also known a vehicular drive system including a differential mechanism in the form of a planetary gear set for distributing an output of a drive power source such as an engine to an electric motor and a power transmitting member. The hybrid vehicle drive systems disclosed in Patent Documents 1 and 4 are examples of this vehicular drive system. In the hybrid vehicle drive system disclosed in Patent Document 1, one of three rotary elements of the planetary gear set is connected to the electric motor, and another of the rotary elements is connected to the drive power source, while the other rotary element is connected to the power transmitting member. The rotating speed of the power transmitting member is continuously variable by controlling an electric load acting on the electric motor. Accordingly, the vehicle can be run with the engine kept in its optimum operating state, so that the fuel economy of the vehicle is improved. The fuel economy can be further improved where a second electric motor is provided in addition to the electric motor connected to the differential mechanism, such that the second electric motor is disposed between the power transmitting member and the drive wheels, so that the second electric motor is operated by an electric power generated by the electric motor connected to the differential mechanism, to drive the drive wheels.

Patent Document 4: JP-3454036

In the vehicular drive system described just above, the rotating speed of the power transmitting member is controlled by controlling an electric reaction force of the electric motor connected to the differential mechanism. In this drive system, therefore, the size of the electric motor must be increased with an increase of the output capacity of the engine, and the required overall size of the vehicular drive system undesirably increases with the increase of the size of the electric motor.

In view of the problem indicated above, it is considered, for example, to provide a coupling device or a differential limiting device connected to the planetary gear set functioning as the differential mechanism, so that the planetary gear set is selectively placed in a non-differential state (namely, in a locked state). The planetary gear set is placed in the locked state by the differential limiting device when the engine is operating in a high-output range, to reduce the maximum value of the electric reaction force generated by the electric motor, whereby the required size of the electric motor can be reduced.

Where the differential limiting device described above is provided, however, the differential limiting device must be connected at a portion thereof to the sun gear of the planetary gear set. Where the differential limiting device and the sun gear are splined to each other, there is a risk of a low degree of accuracy of radial relative positioning of the differential limiting device and the sun gear.

A third aspect of this invention was made in view of the background art described above. It is therefore an object of the invention to provide a vehicular drive system wherein the differential limiting device provided for the differential mechanism has a high degree of support accuracy.

Hybrid vehicle drive systems disclosed in Patent Documents 2, 5 and 6 are known as a vehicular drive system including a differential mechanism for distributing an output of a drive power source such as an engine to an electric motor and a power transmitting member. In the drive system disclosed in Patent Document 2, for example, a planetary gear set functioning as the differential mechanism, a first input shaft receiving the output of the drive power source, and a second input shaft (intermediate shaft) receiving an output of the first input shaft through the planetary gear set are disposed coaxially with each other, such that the sun gear of the planetary gear set and the rotor of the electric motor are rotatable as a unit, and the ring gear of the planetary gear set is connected to the second input shaft through a power transmitting member in the form of a flange formed at one end of the second input shaft, while the carrier of the planetary gear set is connected to the first input shaft such that the carrier and the first input shaft are rotatable as a unit.

In the drive system described just above, the rotating speed of the power transmitting member is continuously variable by controlling an electric load acting on the electric motor, so that the vehicle can be run with the engine kept in its optimum operating state, whereby the fuel economy of the vehicle is improved.

Patent Document 5: JP-2004-161 A
Patent Document 6: JP-2000-85387 A

In the drive system disclosed in Patent Document 2, the first and second input shafts are required to have a high degree of accuracy of coaxial relative positioning. In this drive system of Patent Document 2, however, the first input shaft is supported by the rotor of the electric motor, so that the axial length of support of the first input shaft by the rotor is limited to the length of the rotor. Where the rotor has a relatively short length, therefore, the accuracy of support of the first input shaft by the rotor tends to be low, and there is a risk of a low degree of accuracy of coaxial relative positioning of the first and second input shafts.

A fourth aspect of this invention was made in view of the background art described above. It is therefore an object of the invention to provide a vehicular drive system wherein an input shaft receiving the output of a drive power source is supported with a high degree of accuracy.

DISCLOSURE OF THE INVENTION

The first object indicated above is achieved according to a first aspect of this invention, which provides a vehicular drive system including a first electric motor, a first gear device, a second electric motor and a second gear device, characterized in that the first electric motor and the first gear device constitute a first unit, while the second electric motor and the second gear device constitute a second unit, and in that the first gear device has an output shaft, and the second gear device has an input shaft which is connected to the output shaft of the first gear device, whereby a drive force can be transmitted between the first unit and said second unit.

According to a second aspect of the invention, there is provided a vehicular drive system including a first electric motor, a first gear device, a second electric motor and a second gear device, which are arranged in this order of description, characterized in that the second gear device has an input shaft which is rotatably supported by a support wall disposed between the second electric motor and the second gear device and by a rotor support shaft of the second electric motor, while extending through the rotor support shaft, the input shaft having an axial extension In one form of the invention according to the second aspect of the invention, the output shaft of the first gear device, and the input shaft of the second gear device are connected to each other, whereby a drive force can be transmitted between the first unit and the second unit.

In the vehicular drive system according to the first aspect of the invention, the individually prepared first and second units are assembled together into the drive system such that the output shaft of the power distributing mechanism and the input shaft of the automatic transmission are connected to each other. Accordingly, the drive system has an improved efficiency of assembling.

In the vehicular drive system according to the second aspect of the invention, the second gear device, support wall and second electric motor are arranged in this order of description, and such that the input shaft of the second gear device is supported by the support wall and the rotor support shaft of the second electric motor, which are installed in this order, so that the assembling efficiency is improved.

The vehicular drive system according to one for of the second aspect of the invention has the feature of the first aspect of the invention and the feature of the second aspect of the invention, and therefore has both an advantage of the first aspect of the invention and an advantage of the second aspect of the invention.

In a preferred arrangement of the vehicular drive system according to the first aspect of the invention, the output shaft of the first gear device and the input shaft of the second gear device are connected to each other by spline coupling to each other. The spline coupling of the output shaft of the first gear device and the input shaft of the second gear device permits easy connection of the output and input shafts, so that the efficiency of assembling of the drive system is further improved.

In a preferred arrangement of the above-indicated preferred arrangement of the vehicular drive system, the output shaft of the first gear device has spline teeth formed on an inner circumferential surface thereof, and the input shaft of the second gear device has spline teeth formed on an outer circumferential surface thereof, the spline teeth of the output shaft of the first gear device and the spline teeth of the input shaft of said second gear device being held in meshing engagement with each other.

In a preferred arrangement of the vehicular drive system according to the second aspect of this invention, the support wall has an outer circumferential surface held in abutting contact with an inner circumferential surface of a casing of the second unit, and the rotor support shaft of the second electric motor is rotatably supported by the support wall. Since the support wall is held in abutting contact with the casing, the support wall is accurately positioned in the radial direction, so that the rotor support shaft of the second electric motor which is supported by this support wall is accurately positioned in the axial direction.

In a preferred arrangement of the vehicular drive system, another support wall is provided on one side of the second electric motor which is remote from the above-indicated support wall, and this another support wall has an outer circumferential surface held in abutting contact with an inner circumferential surface of the casing of the second unit, the rotor support shaft of the second electric motor being rotatably supported by the above-indicated another support wall. In this arrangement, the rotor support shaft of the second electric motor is supported by the two support walls which are provided on the respective opposite sides of the second electric motor and which are accurately positioned in the radial direction, so that the rotor support shaft is positioned in the radial direction with a higher degree of accuracy.

In one form of the vehicular drive system according to the above-described first or second aspect of this invention, a rotor support shaft of the first electric motor and an input shaft of the first gear device are connected to each other so as to be rotated as a unit, the vehicular drive system further comprising an input shaft which is disposed radially inwardly of the rotor support shaft of the first electric motor and the input shaft of the first gear device and which is supported rotatably relative to the rotor support shaft of the first electric motor and the input shaft of the first gear device.

In another form of the vehicular drive system according to the above-described first or second aspect of this invention, the first electric motor has a rotor support shaft which is supported at one end thereof by a wall portion of a casing, and at the other end thereof by a lid plate fixed to the casing so as to close an open end of the casing which is remote from the wall portion.

The second object indicated above is achieved according to a second aspect of this invention, which provides a vehicular drive system including an output shaft, and a support member for rotatably supporting the output shaft, the vehicular drive system comprising: a casing having a wall which partially defines an accommodating chamber; and a hydraulically operated frictional coupling device which includes a rotary member and a piston member disposed in the accommodating chamber and which is provided to change a power transmitting state of the vehicular drive system, by selectively preventing a rotary motion of the rotary element by moving the piston member to fix the rotary element to the casing, and wherein the wall of the casing which partially defines the accommodating chamber has an axial groove formed in an inner circumferential surface thereof such that the axial groove is open at one end thereof toward the support member.

In the vehicular drive system described just above, the axial groove formed in the inner circumferential surface of the wall partially defining the accommodating chamber is open at one end thereof toward the support member supporting the output shaft, so that the lubricating oil which has lubricated the support member is discharged through the axial groove. Further, the axial groove is formed in the wall partially defining the accommodating chamber accommodating the piston member, so that the weight of the wall and consequently the weight of the drive system can be reduced.

In a preferred arrangement of the above-described vehicular drive system, the output shaft has an oil passage through which a lubricating oil is supplied to the support member.

The third object indicated above is achieved according to a third aspect of the invention, which provides a vehicular drive system comprising: a casing; a drive power source; an electric motor; a power transmitting member; a differential mechanism constituted by a planetary gear device, including, an input shaft and arranged to distribute an output of the power drive source to the electric motor and the power transmitting member, said planetary gear device having a sun gear; and a power distributing mechanism having a differential limiting device operable to limit a differential function of the differential mechanism, and wherein the differential limiting device has a portion formed integrally with the sun gear of the planetary gear device, and the electric motor includes a rotor having a hub rotatably supported by the casing, the input shaft through which the output of the drive power source being transmitted to the differential mechanism is rotatably supported by the hub of the rotor, and the sun gear supported by the input shaft.

In one preferred arrangement of the vehicular drive system described just above, the rotor of the electric motor and the sun gear of the planetary gear device are coupled to each other for rotation as a unit.

In the above-described preferred arrangement of the vehicular drive system, the rotor of the electric motor and the sun gear of the planetary gear device are splined to each other.

In the above-descried preferred arrangement of the vehicular drive system, the rotor is splined at an inner circumferential surface thereof to the sun gear.

In a further preferred arrangement of the vehicular drive system, the portion of the differential limiting device and the sun gear are welded together, whereby the portion of the differential limiting device and the sun ear are integrally fixed to each other.

The fourth object indicated above is achieved according to a fourth aspect of this invention, which provides a vehicular drive system comprising: a drive power source; an electric motor having a rotor; a power transmitting member; a first input shaft which receives an output of the drive power source; a differential mechanism arranged to distribute the output of the power drive source to the electric motor and the power transmitting member; and a second input shaft which is connected to the power transmitting member and which transmits a portion of the above-indicated output received by the power transmitting member, to a power transmitting path operatively connected to a drive wheel of a vehicle, and wherein the first input shaft is supported by first support means provided on the rotor of the electric motor, and second support means provided on the second input shaft.

In the vehicular drive system described just above, the first shaft is supported by the rotor of the first electric motor and the second input shaft which is a member other than the rotor, so that a span of support of the first input shaft can be increased. Accordingly, the first input shaft is supported with a higher degree of positioning accuracy. Further, the first input shaft is supported by the second input shaft via the second support means, so that the first and second input shafts are radially aligned with each other with a high degree of accuracy.

In a preferred arrangement of the above-described vehicular drive system, the rotor of the electric motor is supported by a first support wall provided on a casing via third support means.

In another preferred arrangement of the above-described vehicular drive system, the second input shaft is supported by second support wall provided on a casing via the first support means.

Figures 1, 2:
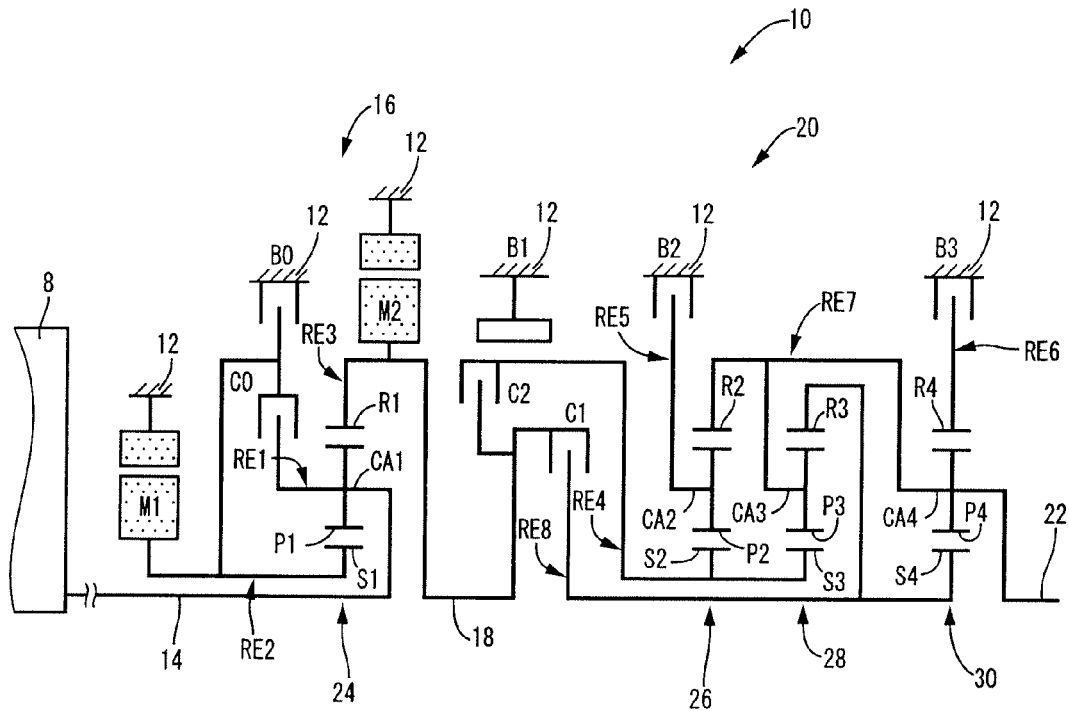
FIG. 1 is a schematic view showing an arrangement of a drive system for a hybrid vehicle, which is constructed according to a first embodiment of the present invention.
FIG. 2 is a table indicating shifting actions of the drive system of the hybrid vehicle of the embodiment of FIG. 1 operable in a selected one of a continuously-variable shifting state and a step-variable shifting state, in relation to different combinations of operating states of hydraulically operated frictional coupling devices to effect the respective shifting actions.
Figure 3:
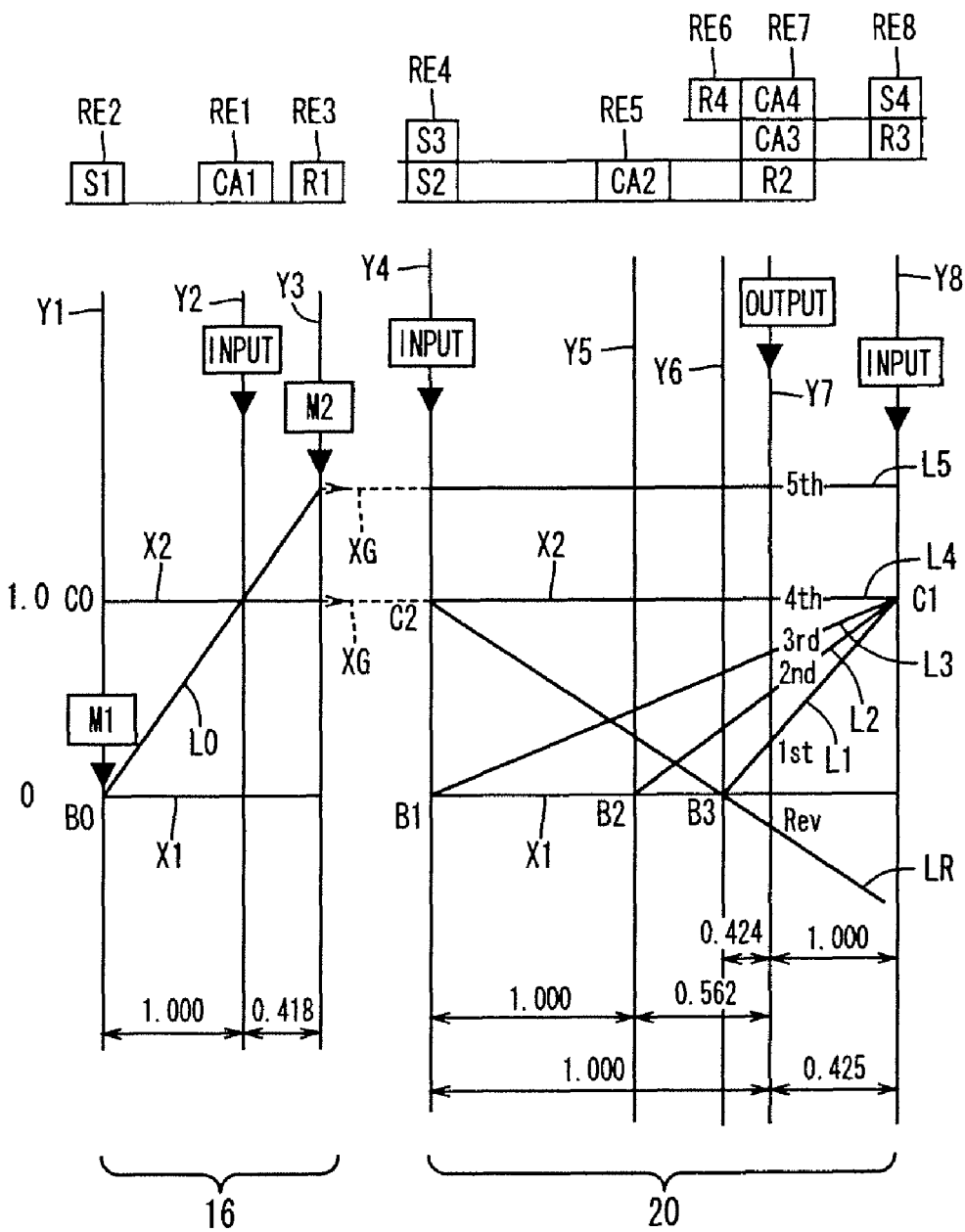
Figure 4:
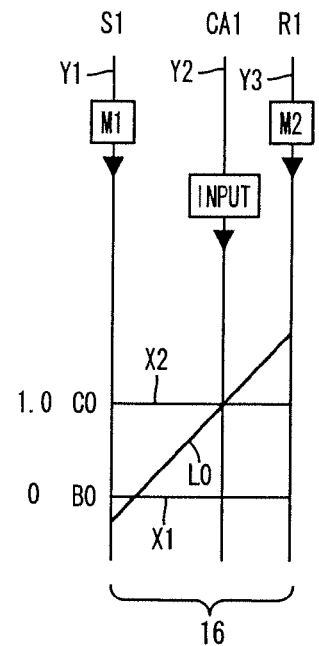
Figure 5:
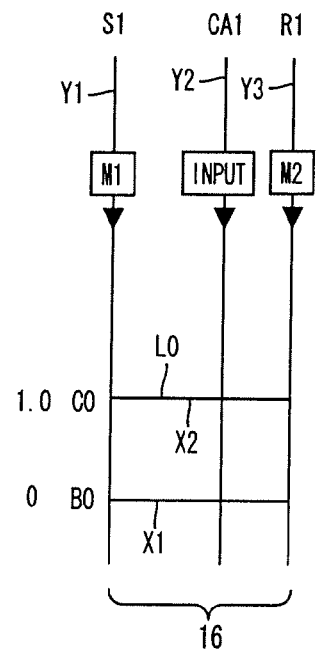
Figure 6:
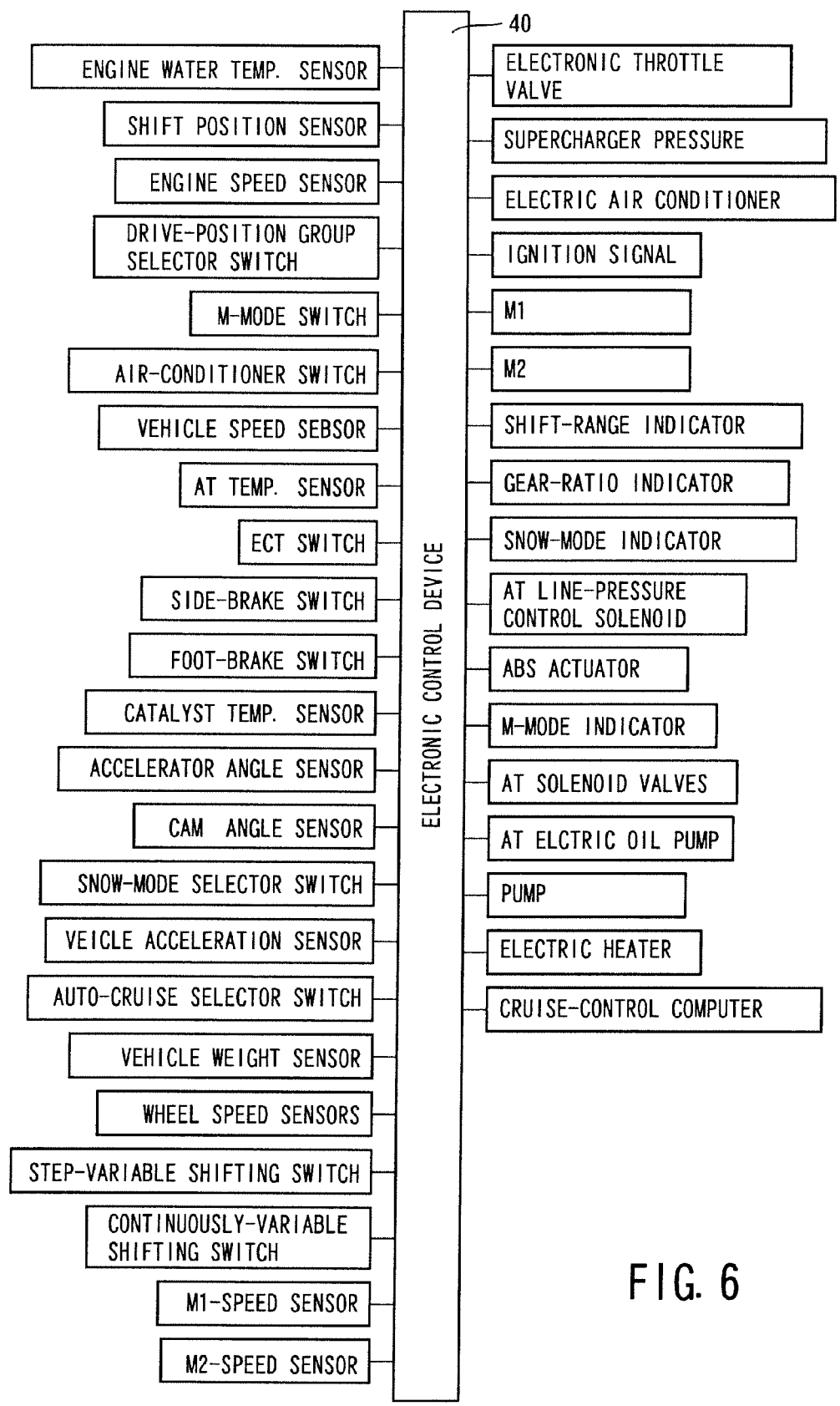
Figure 7:
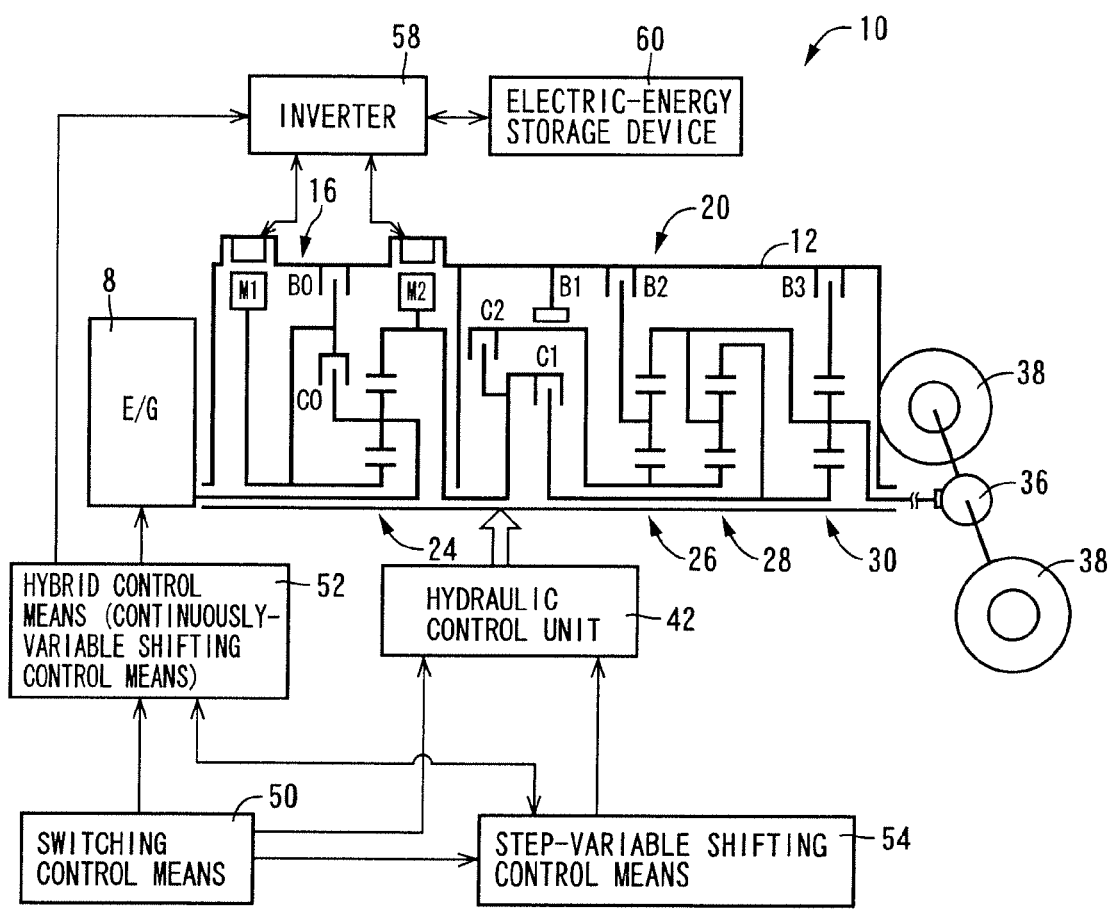
Figure 8:
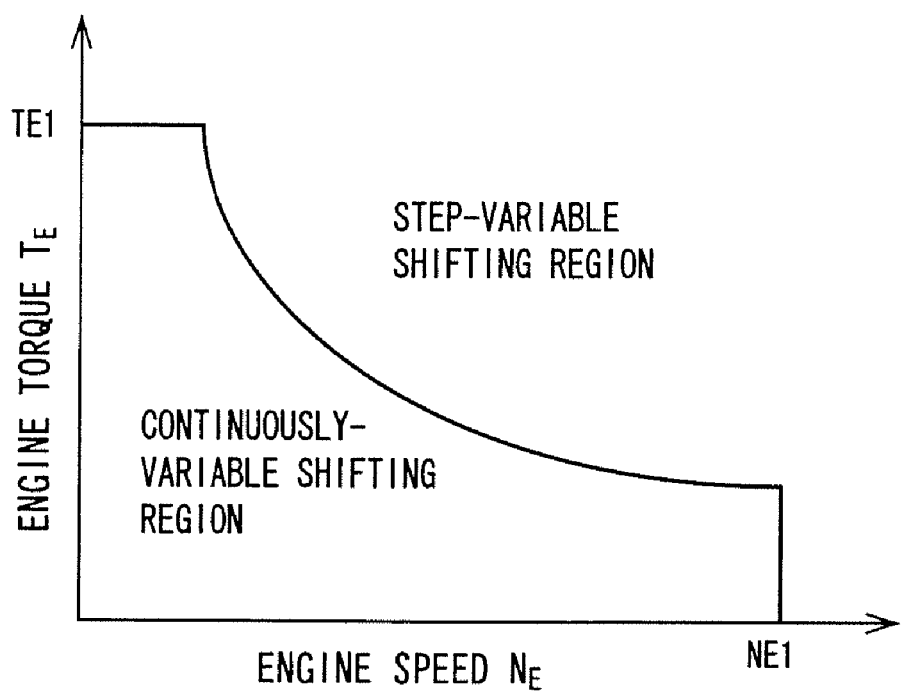
Figure 9:
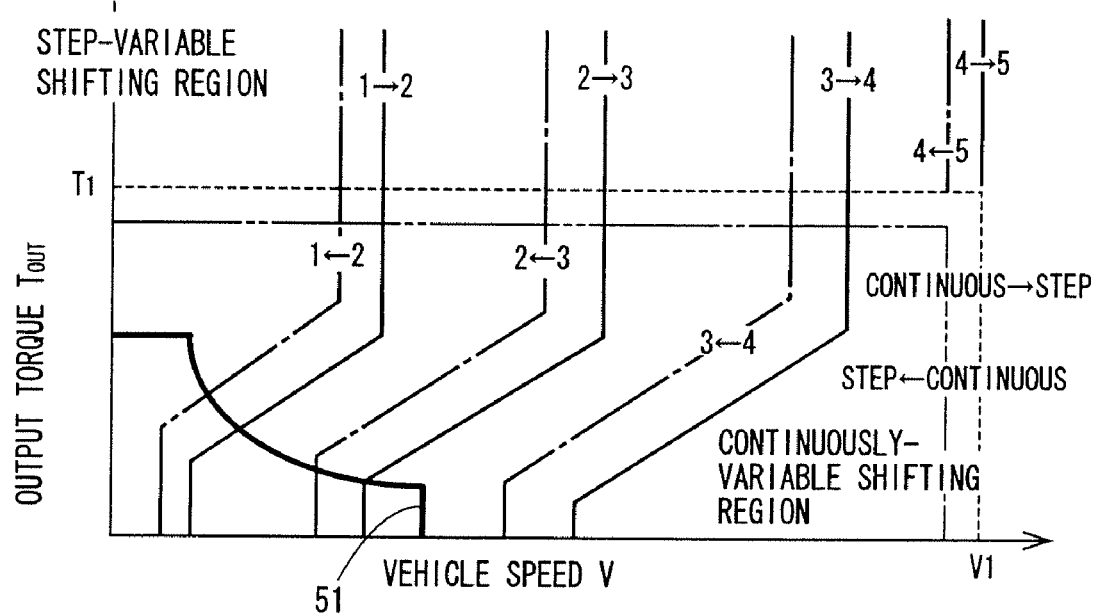
Figure 10:
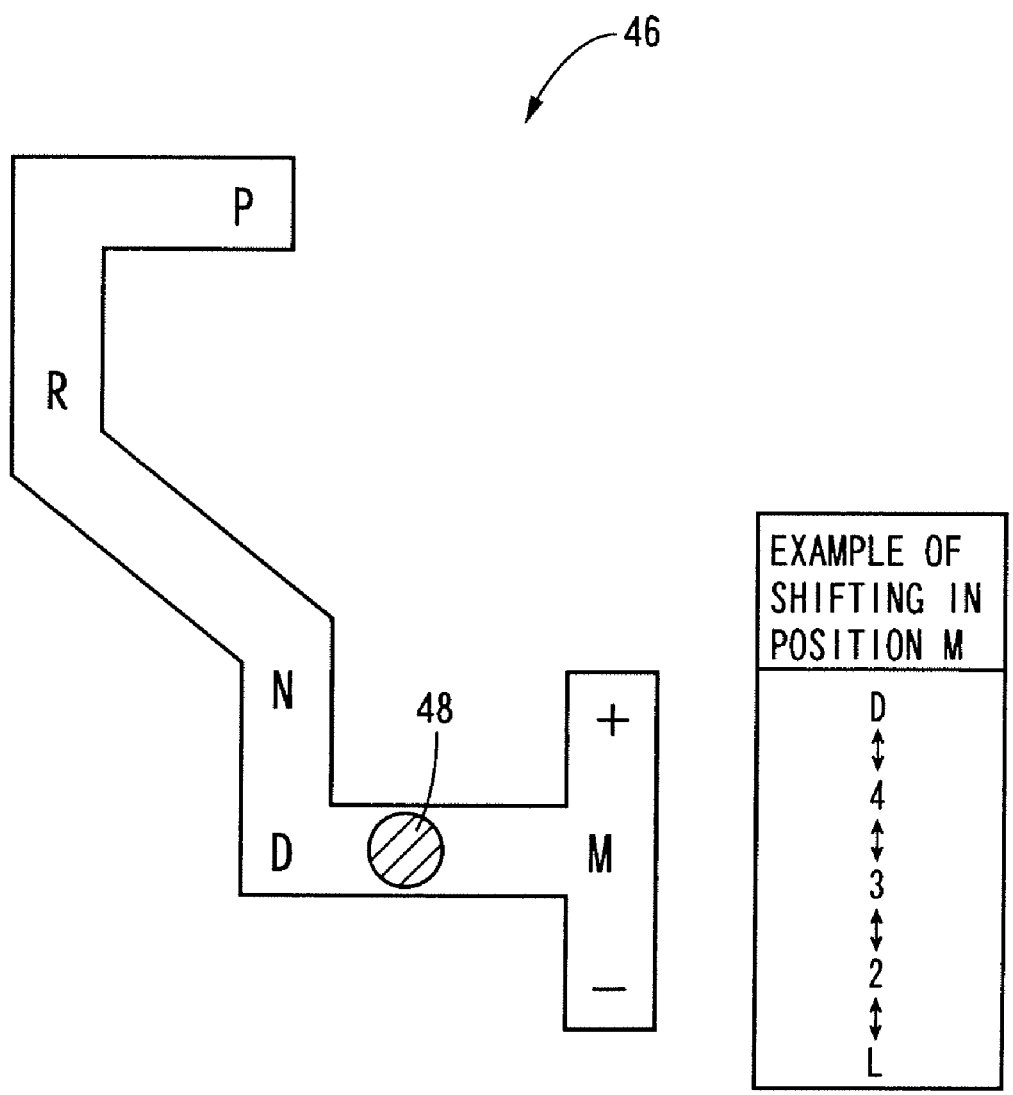
Figure 11:
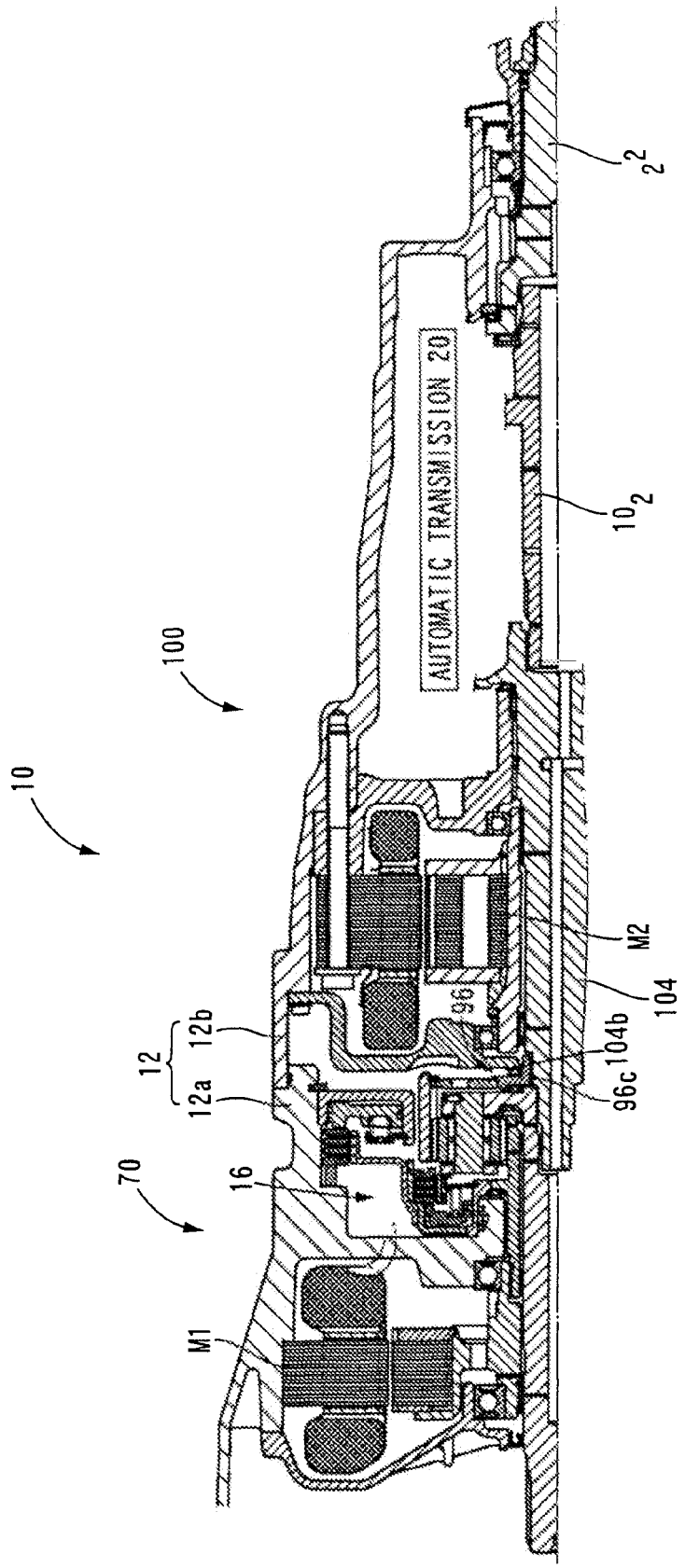
Figure 12:
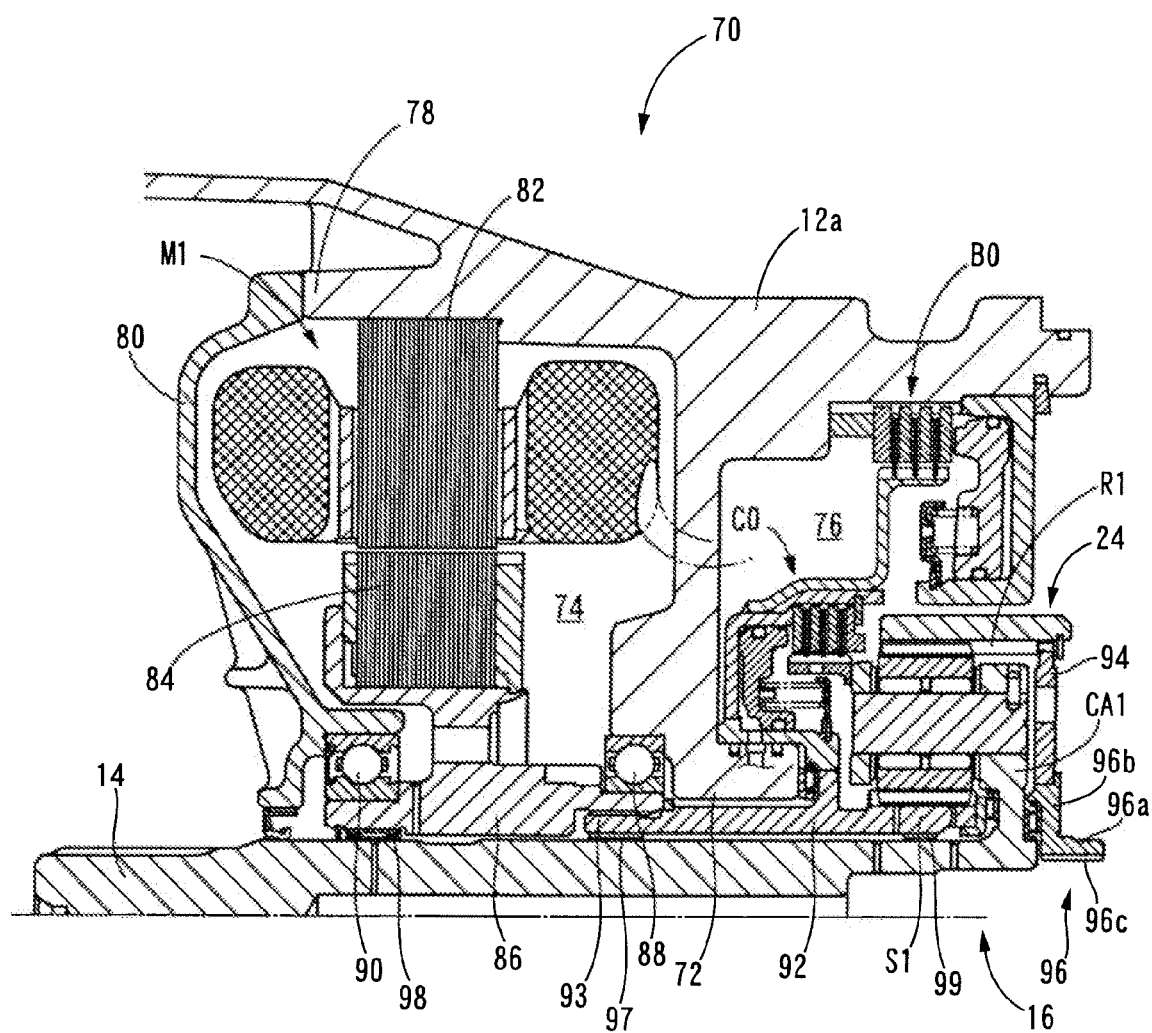
Figure 13:
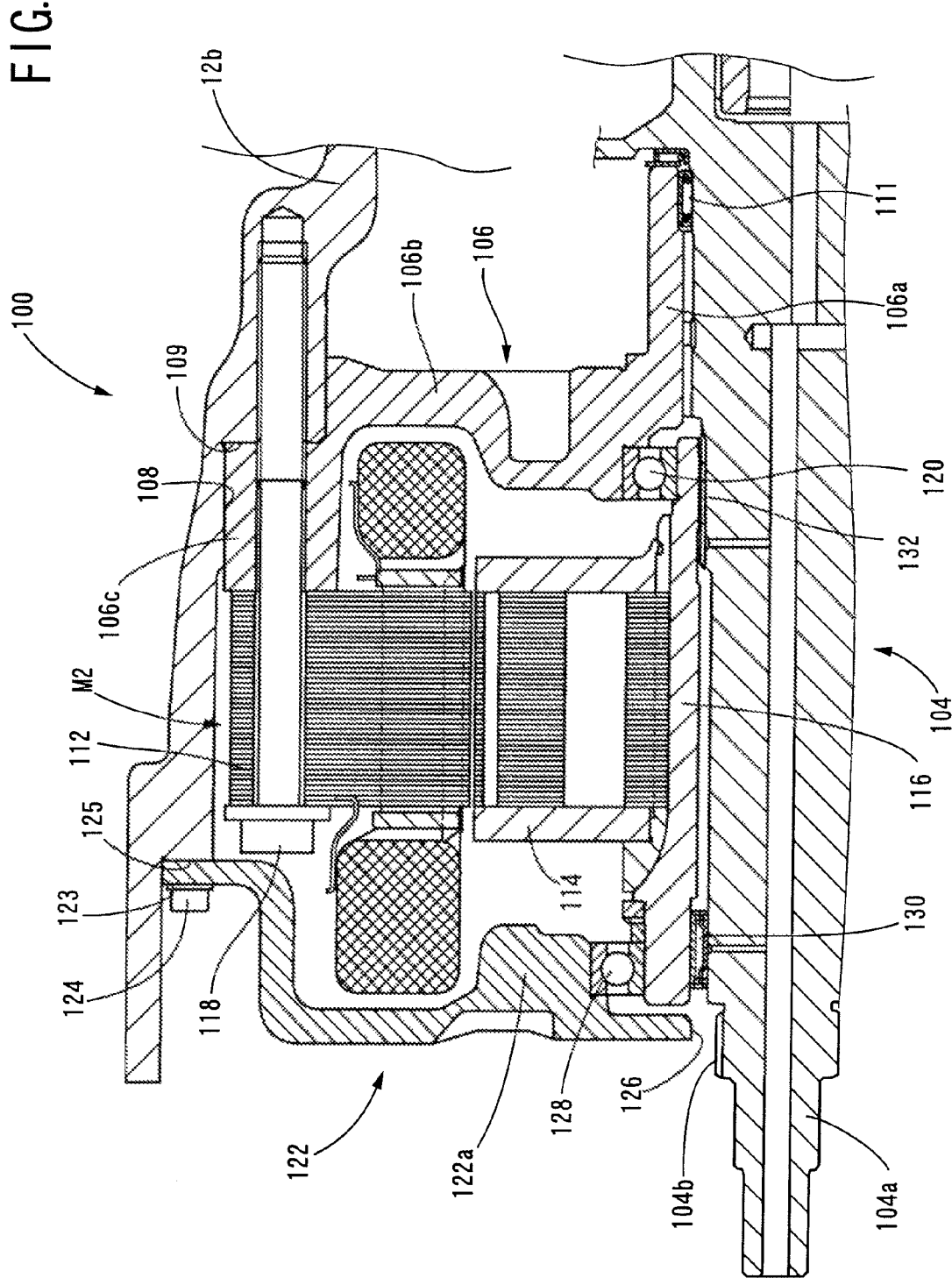
Figure 14:
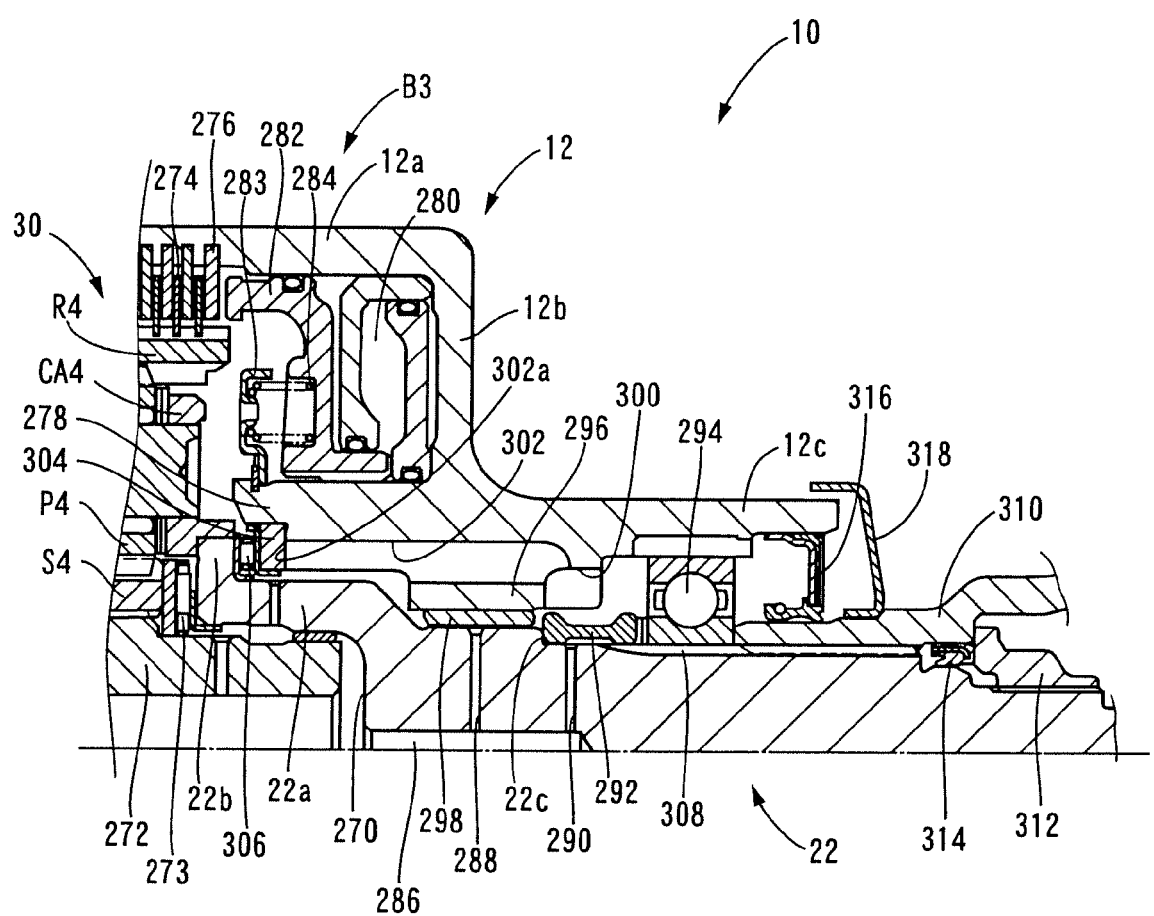
Figure 15:
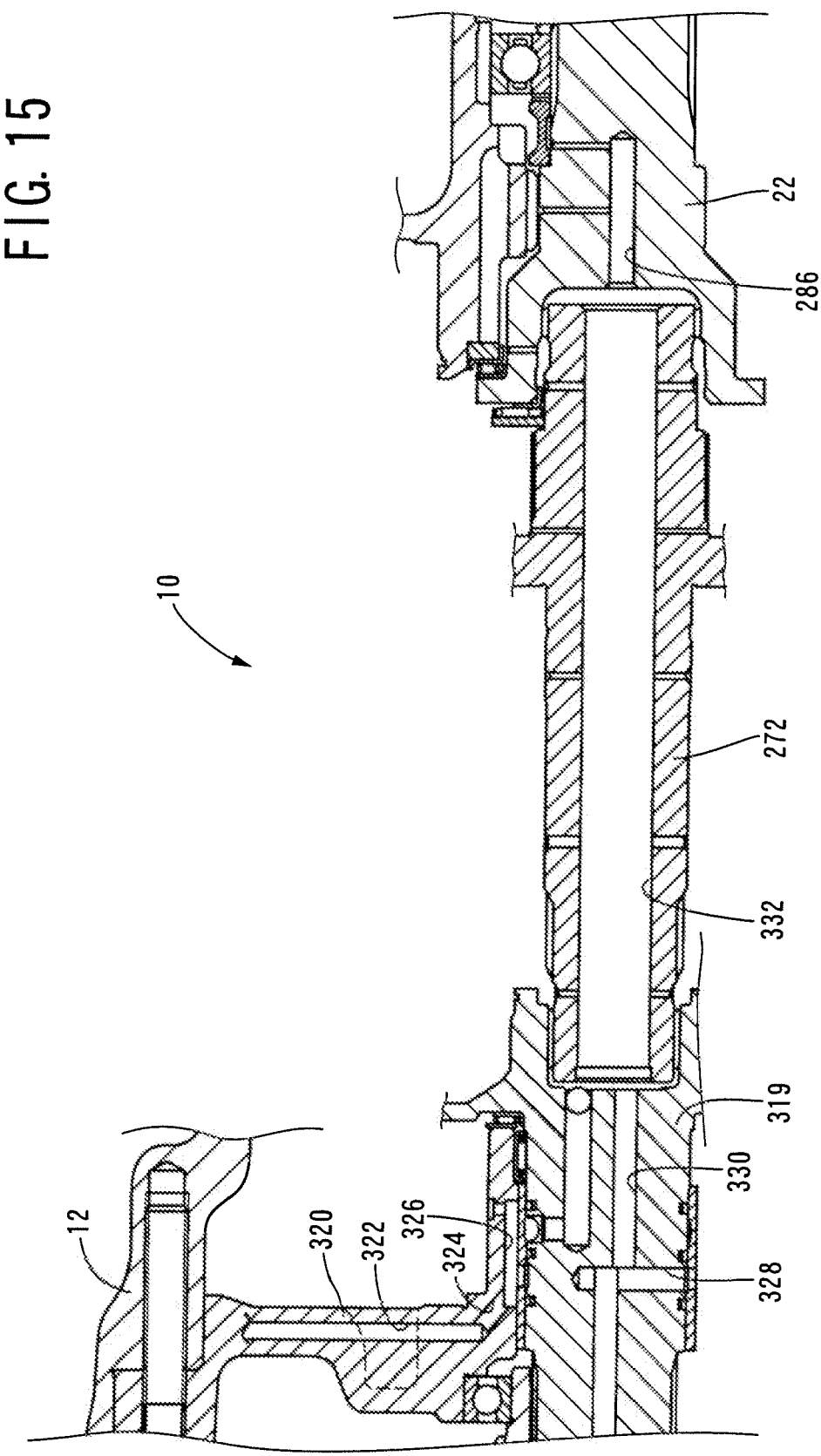
Figure 16:
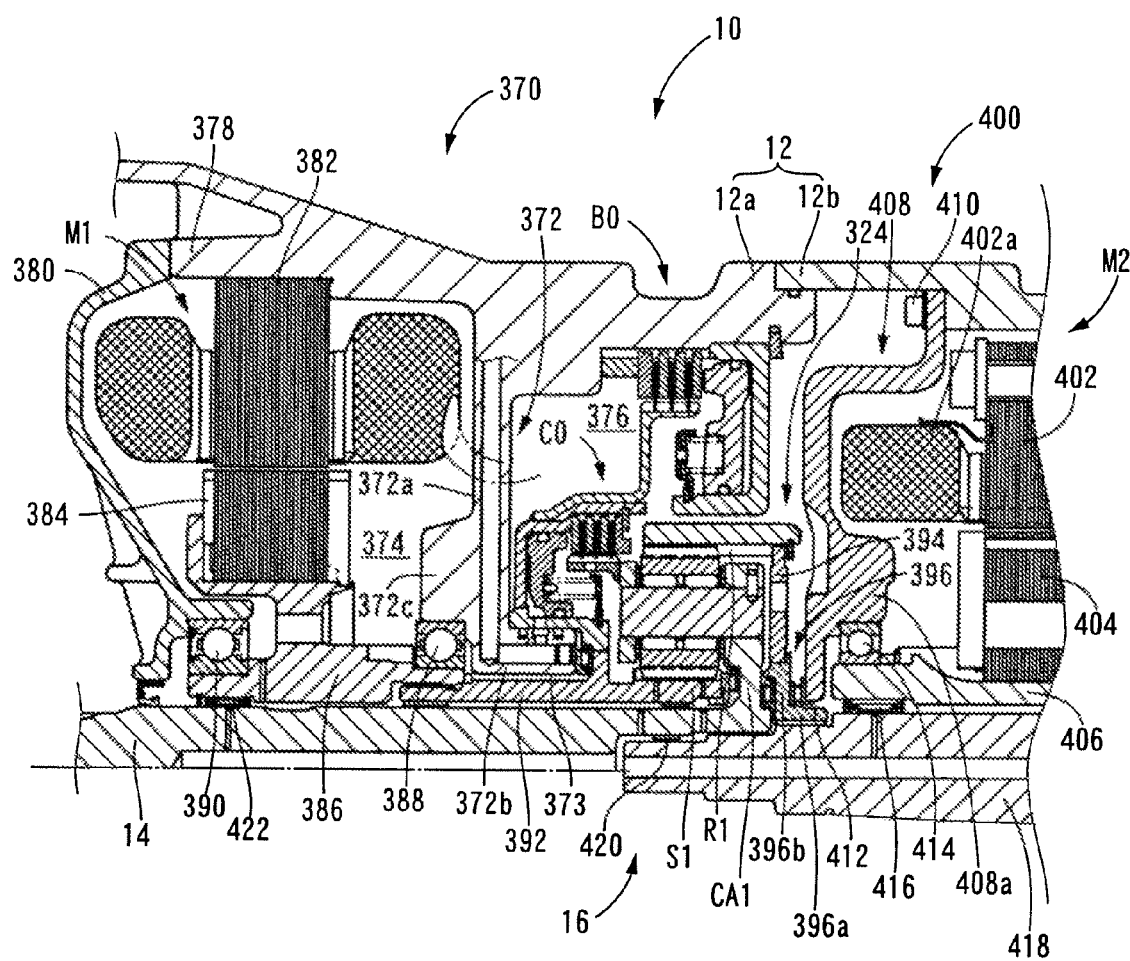
Figure 17:
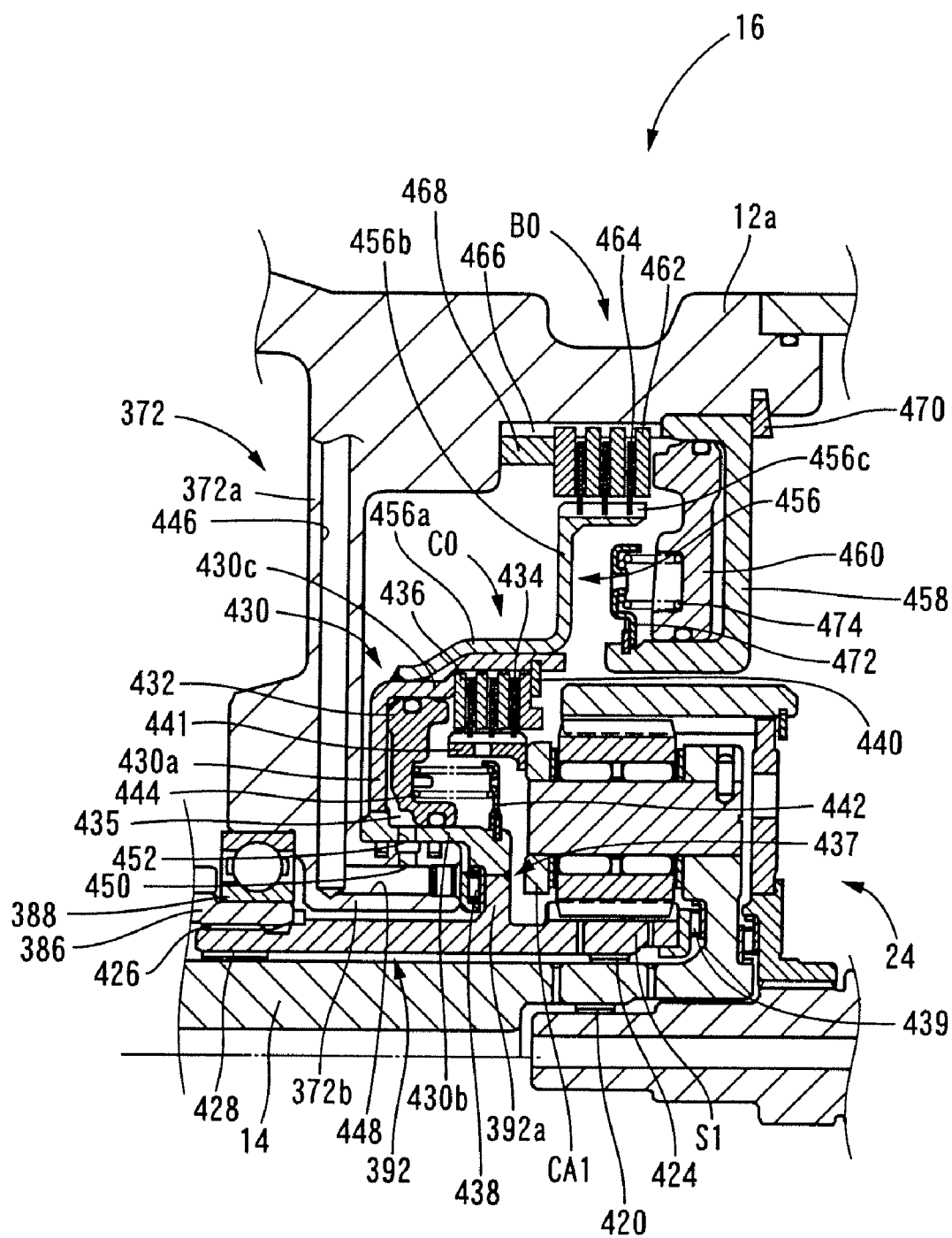
Figure 18:
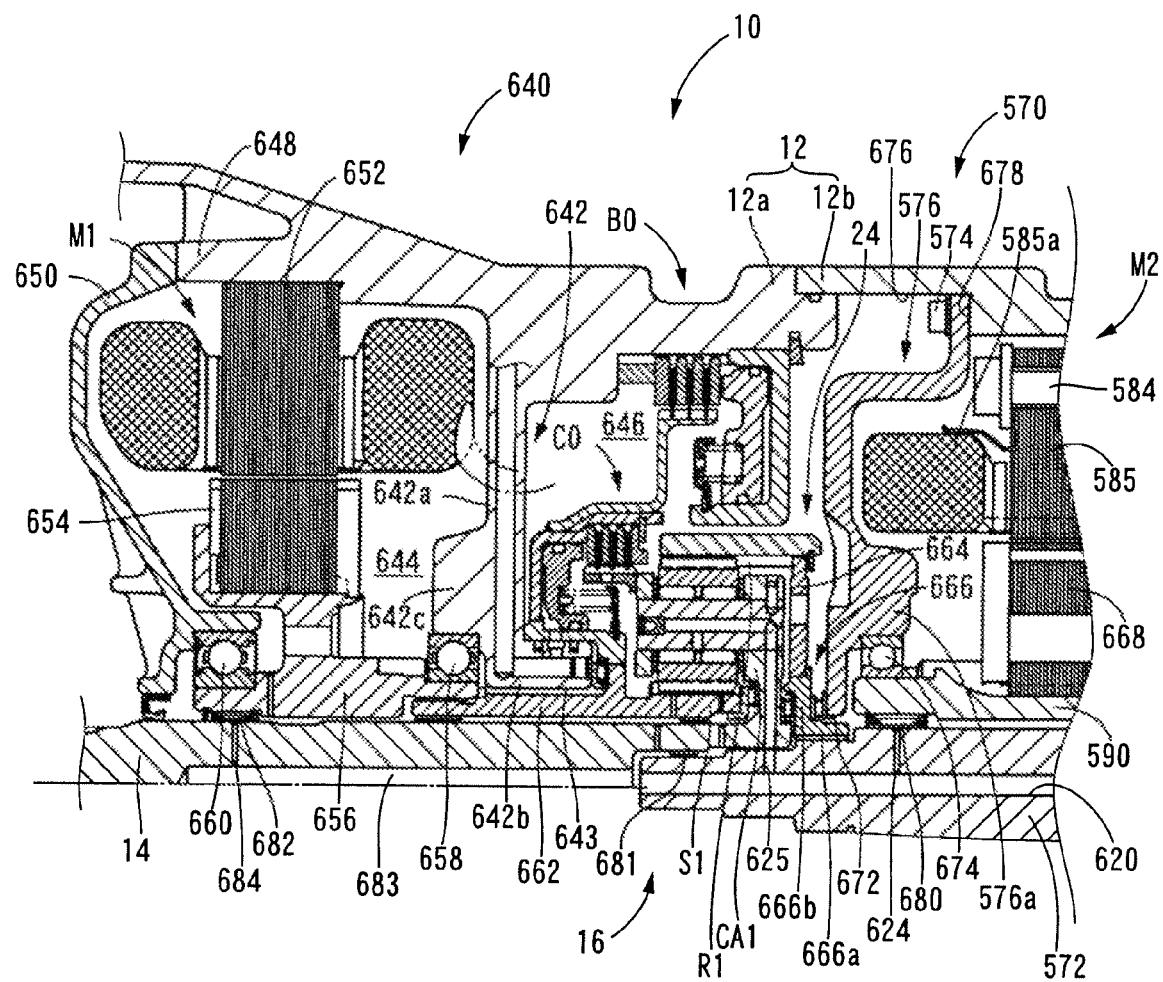
Figure 19:
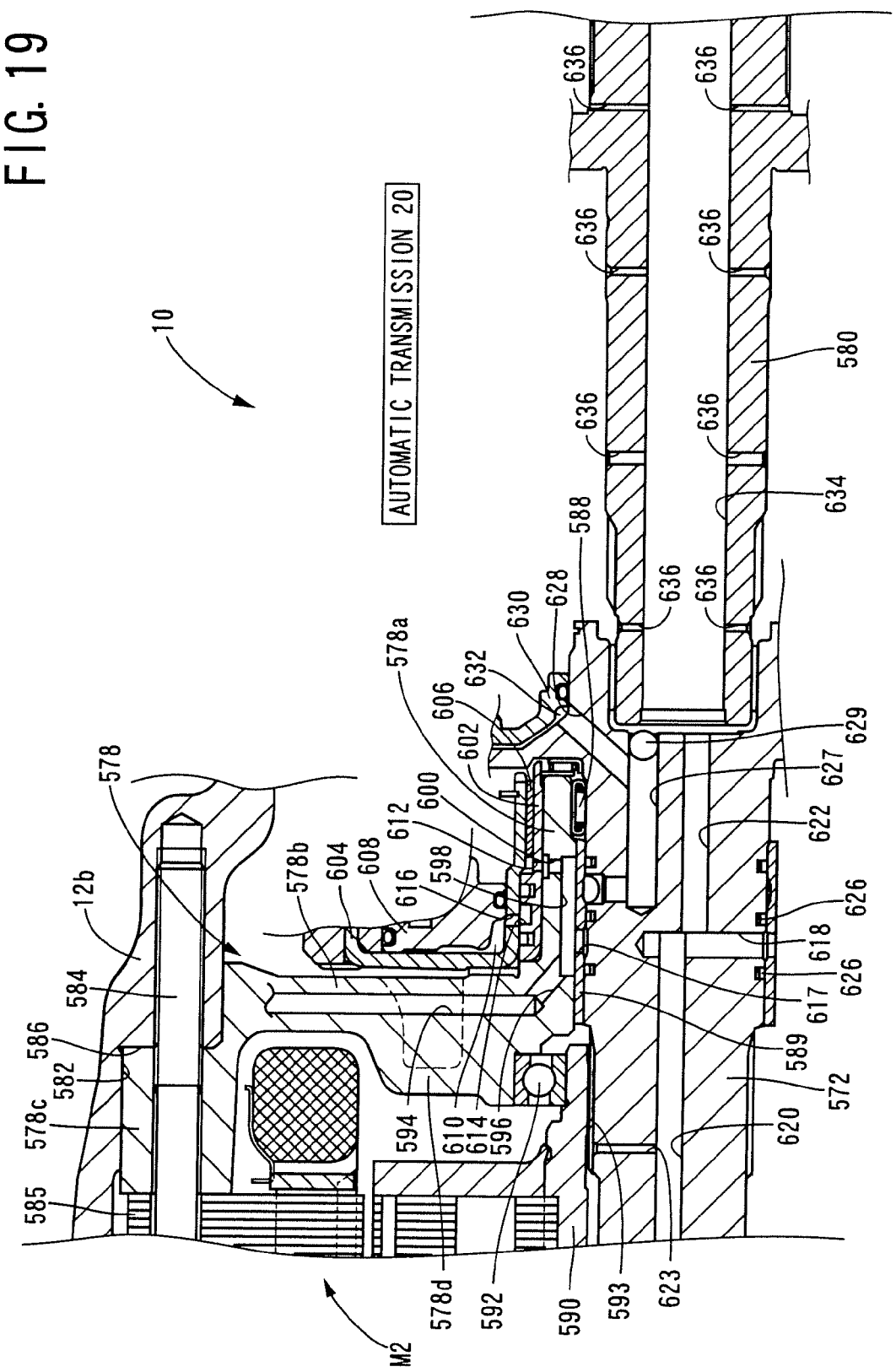
Figure 20:
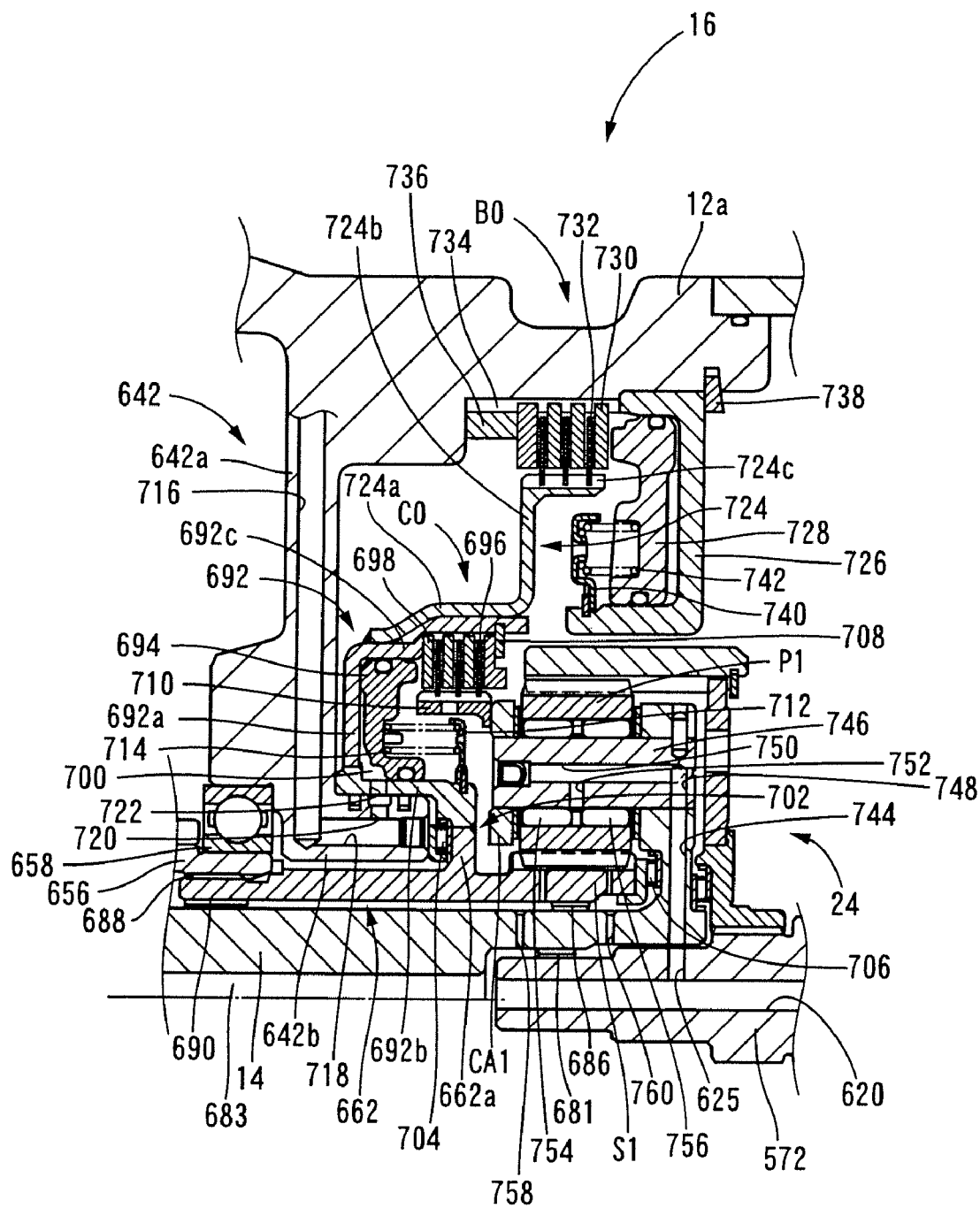

FIG. 3 is a collinear chart indicating relative rotating speeds of rotary elements of the drive system of the hybrid vehicle of the embodiment of FIG. 1 operated in the step-variable shifting state, in different gear positions of the drive system;

FIG. 4 is a view showing an example of an operating state of a power distributing mechanism of the drive system placed in the continuously-variable shifting state, the view corresponding to a part of the collinear chart of FIG. 3 which shows the power distributing mechanism;

FIG. 5 is a view showing the operating state of the power distributing mechanism placed in the step-variable shifting state by engagement of a switching clutch CO, the view corresponding to the part of the collinear chart of FIG. 3 which shows the power distributing mechanism;

FIG. 6 is a view indicating input and output signals of an electronic control device provided in the drive system of the embodiment of FIG. 1;

FIG. 7 is a functional block diagram illustrating major control functions performed by the electronic control device of FIG. 6;

FIG. 8 is a view indicating a stored predetermined relationship used by the switching control means of FIG. 7 for switching between a continuously-variable shifting region and a step-variable shifting region;

FIG. 9 is a view indicating a stored predetermined relationship used by the switching control means of FIG. 7, which is different from that of FIG. 8;

FIG. 10 is a view illustrating a manually operable shifting device including a shift lever, which is used to select one of a plurality of gear positions of the drive system;

FIG. 11 is a cross sectional view of the drive system of FIG. 1;

FIG. 12 is a cross sectional view of a first unit of the drive system of FIG. 1;

FIG. 13 is a fragmentary enlarged view in cross section of a second unit of the drive system of FIG. 11;

FIG. 14 is a cross sectional view of an output shaft portion of a drive system according to a second embodiment of this invention;

FIG. 15 is a fragmentary cross sectional view of the drive system of FIG. 14, for explaining passages for introducing a lubricating oil into an axial hole in the output shaft of the drive system;

FIG. 16 is a fragmentary cross sectional view of a drive system according to a third embodiment of this invention;

FIG. 17 is an enlarged view of a power transmitting mechanism of FIG. 16;

FIG. 18 is a fragmentary cross sectional view of a drive system according to a fourth embodiment of this invention;

FIG. 19 is a fragmentary cross sectional view of the drive system of FIG. 18; and FIG. 20 is an enlarged view of a power transmitting mechanism of FIG. 18.

EXPLANATION OF REFERENCE SIGNS

8; Engine (Drive power source)
10: Vehicular drive system
12: Casing
14: Differential mechanism input shaft (First input shaft)
16: Power distributing mechanism (First gear device)
18: Power transmitting member
20: Step-variable automatic transmission (Second gear device)
22: Drive system output shaft (Output shaft)
24: First planetary gear set (Differential mechanism)
70: First unit
72: First support wall (Wall portion)
80: Lid plate
96: Output shaft (of first planetary gear set)
96c: Spline teeth (of output shaft)
100: Second unit
104: Input shaft (of automatic transmission)
104b: Spline teeth of (input shaft)
106: Second support wall
116: Second rotor support shaft
122: Third support wall
278: Sliding wall
280: Accommodating chamber
282: Brake piston (Piston member)
290: Second radial hole (Oil passage)
302: Groove
386: Fist rotor support shaft (Hub of rotor)
430: Clutch cylinder
572: Transmission input shaft (Second input shaft)
576: Second support wall
642: First support wall
656: Rotor support shaft
660: Bearing (Third support means)
666: Output shaft of first planetary gear set (Power transmitting member)
680: Bearing (Fourth support means)
681: Bushing (Second support means)
682: Bearing (First support means)
B3: Third brake (Hydraulically operated frictional coupling device)
M1: First electric motor
M2: Second electric motor
S1: First sun gear
R4: Fourth ring gear (Rotary element)

BEST MODE FOR CARRYING OUT THE INVENTION

Referring to the drawings, there will be described in detail the embodiments of the present invention.

Referring to the schematic view of there is shown a drive system 10 for a hybrid vehicle, which is constructed according to a first embodiment of this invention. The drive system 10 shown in FIG. 1 includes: an input rotary member in the form of a differential mechanism input shaft 14; a power distributing mechanism 16 connected to this differential mechanism input shaft 14 either directly, or indirectly via a pulsation absorbing damper (vibration damping device) not shown; a power transmitting device in the form of a step-variable automatic transmission 20 disposed between the power distributing mechanism 16 and a drive system output shaft 22, such that the automatic transmission 20 is connected in series to the power distributing mechanism 16 through a power transmitting member 18; and an output rotary member in the form of the drive system output shaft 22 connected to the automatic transmission 20. The input shaft 14, power distributing mechanism 16, step-variable automatic transmission 20 and output shaft 22 are disposed on a common axis in a transmission casing 12 (hereinafter abbreviated as "casing 12") which functions as a stationary member or a non-rotary member attached to the body of the vehicle. In the present embodiment, the power distributing mechanism 16 serves as a first gear device, while the step-variable automatic transmission serves as a second gear device.

This drive system 10 is suitably used for a transverse FR vehicle (front-engine, rear-drive vehicle), and is disposed between a drive power source in the form of an engine 8 and a pair of drive wheels 38, to transmit a vehicle drive force to the pair of drive wheels 38 through a differential gear device (final speed reduction gear) 36 and a pair of drive axles, as shown in FIG. 7. It is noted that a lower half of the drive system 10, which is constructed symmetrically with respect to its axis, is omitted in FIG. 1.

The differential mechanism input shaft 14 is connected at its one end to the engine 8, and the power distributing mechanism 16 is a mechanism configured to mechanically synthesize an output of the engine 8 received from the differential mechanism input shaft 14, or to mechanically distribute the output of the engine 8. That is, the power distributing mechanism 16 distributes the output of the engine 8 to a first electric motor M1 and the power transmitting member 18, or synthesizes the output of the engine 8 and the output of the first electric motor M1 and transmits a sum of these outputs to the power transmitting member 18. In the present embodiment, each of the first electric motor M1 and a second electric motor M2 is a so-called motor/generator functioning as an electric generator as well as an electric motor. The first electric motor M1 should function at least as an electric generator operable to generate an electric energy while generating a reaction force, and the second electric motor M2 should function at least as an electric motor operable to generate a vehicle drive force.

The power distributing mechanism 16 includes a first planetary gear set 24 of a single pinion type functioning as the differential mechanism and having a gear ratio $\rho 1$ of about 0.418, for example, a switching clutch C0 and a switching brake B0. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho 1$ is represented by ZS1/ZR1.

In the power distributing mechanism 16, the first carrier CA1 is connected to the differential mechanism input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, the power distributing mechanism 16 is placed in a differential state in which the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 which is distributed to the first electric motor M1 is used to drive the first electric motor M1 to generate an electric energy which is stored or used to drive the second electric motor M2. Accordingly, the power distributing mechanism 16 is placed in the continuously-variable shifting state in which the rotating speed of the power transmitting member 18 is continuously variable, irrespective of the rotating speed of the engine 8, namely, in the differential state or continuously-variable shifting state in which the power distributing mechanism 16 functions as an electrically controlled continuously variable transmission whose speed ratio $\gamma 0$ (rotating speed of the differential mechanism input shaft 14/rotating speed of the power transmitting member 18) is continuously variable from a minimum value $\gamma 0$ min to a maximum value $\gamma 0$ max.

When the switching clutch C0 is engaged during running of the vehicle by the output of the engine 8 while the power distributing mechanism 16 is placed in the continuously-variable shifting state, the first sun gear S1 and the first carrier CA1 are connected together, so that the power distributing mechanism 16 is brought into a locked state or non-differential state in which the three rotary elements of the first planetary gear set 24 consisting of the first sun gear S1, first carrier CA1 and first ring gear R1 are rotatable as a unit. In this non-differential state in which the rotating speed of the engine 8 and the rotating speed of the power transmitting member 18 are made equal to each other, the power distributing mechanism is placed in a fixed-speed-ratio shifting state in which the power distributing mechanism 16 functions as a transmission having a fixed speed ratio $\gamma 0$ equal to 1. When the switching brake B0 is engaged in place of the switching clutch C0, the power distributing mechanism 16 is placed in the locked or non-differential state in which the first sun gear S1 is not rotatable, so that the rotating speed of the first ring gear R1 is made higher than that of the first carrier CA1, whereby the power distributing mechanism 16 is placed in the fixed-speed-ratio shifting state in which the power distributing mechanism 16 functions as a speed-increasing transmission having a fixed speed ratio $\gamma 0$ smaller than 1, for example, about 0.7. In the present embodiment described above, the switching clutch C0 and brake B0 function as a differential-state switching device operable to selectively place the first planetary gear set 24 in the differential state (continuously-variable shifting state) in which the first planetary gear set 24 functions as an electrically controlled continuously variable transmission the speed ratio of which is continuously variable, and in the non-differential state, namely, in the locked state in which the first planetary gear set 24 does not function as the electrically controlled continuously variable transmission having the continuously-variable shifting function, that is, in the fixed-speed-ratio shifting state in which the first planetary gear set 24 functions as a transmission having a single gear position with one speed ratio or a plurality of gear positions with respective speed ratios.

The automatic transmission 20 includes a plurality of planetary gear sets, that is, a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio $\rho 3$ of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear r4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission 20, the second sun gear S2 and the third sun gear S3 are integrally fixed to each other as a unit, selectively connected to the power transmitting member 18 through a second clutch C2, and selectively fixed to the casing 12 through a first brake B1. The fourth ring gear R4 is selectively fixed to the casing 12 through a third brake B3, and the second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are superposed on each other and which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the drive system 10 constructed as described above, one of a first-gear position (first-speed position) through a fifth-gear position (fifth-speed position), a reverse-gear position (rear-drive position) and a neural position is selectively established by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 2. Those gear positions have respective speed ratios γ (input shaft speed $N_{IN}$/output shaft speed $N_{OUT}$) which change as geometric series. In particular, it is noted that the power distributing mechanism 16 is provided with the switching clutch C0 and brake B0, so that the power distributing mechanism 16 can be selectively placed by engagement of the switching clutch C0 or switching brake B0, in the fixed-speed-ratio shifting state in which the power distributing mechanism 16 is operable as a transmission having a single gear position with one speed ratio or a plurality of gear positions with respective speed ratios, as well as in the continuously-variable shifting state in which the power distributing mechanism 16 is operable as a continuously variable transmission, as described above. In the present drive system 10, therefore, a step-variable transmission is constituted by the automatic transmission 20, and the power distributing mechanism 16 which is placed in the fixed-speed-ratio shifting state by engagement of the switching clutch C0 or switching brake B0. Further, a continuously variable transmission is constituted by the automatic transmission 20, and the power distributing mechanism 16 which is placed in the continuously-variable shifting state, with none of the switching clutch C0 and brake B0 being engaged.

Where the drive system 10 functions as the step-variable transmission, for example, the first-gear position having the highest speed ratio γ1 of about 3.357, for example, is established by engaging actions of the switching clutch C0, first clutch C1 and third brake B3, and the second-gear position having the speed ratio γ2 of about 2.180, for example, which is lower than the speed ratio γ1, is established by engaging actions of the switching clutch C0, first clutch C1 and second brake B2, as indicated in FIG. 2. Further, the third-gear position having the speed ratio γ3 of about 1.424, for example, which is lower than the speed ratio γ2, is established by engaging actions of the switching clutch C0, first clutch C1 and first brake B1, and the fourth-gear position having the speed ratio γ4 of about 1.000, for example, which is lower than the speed ratio γ3, is established by engaging actions of the switching clutch C0, first clutch C1 and second clutch C2. The fifth-gear position having the speed ratio γ5 of about 0705, for example, which is smaller than the speed ratio γ4, is established by engaging actions of the first clutch C1, second clutch C2 and switching brake B0. Further, the reverse-gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the drive system 10 functions as the continuously-variable transmission, on the other hand, the switching clutch C0 and the switching brake B0 are both released, as indicated in FIG. 2, so that the power distributing mechanism 16 functions as the continuously variable transmission, while the automatic transmission 20 connected in series to the power distributing mechanism 16 functions as the step-variable transmission, whereby the speed of the rotary motion transmitted to the automatic transmission 20 placed in one of the first-gear, second-gear, third-gear and fourth-gear positions, namely, the rotating speed of the power transmitting member 18 is continuously changed, so that the speed ratio when the automatic transmission 20 is placed in one of those gear positions is continuously variable over a predetermined range. Accordingly, the speed ratio of the automatic transmission 20 is continuously variable across the adjacent gear positions, whereby an overall speed ratio γT of the drive system 10 is continuously variable.

The collinear chart of FIG. 3 indicates, by straight lines, a relationship among the rotating speeds of the rotary elements in each of the gear positions of the drive system 10, which is constituted by the power distributing mechanism 16 functioning as the continuously-variable shifting portion or first shifting portion, and the automatic transmission 20 functioning as the step-variable shifting portion or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines X1, X2, XG, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18. Three vertical lines Y1, Y2 and Y3 correspond to three elements of the power distributing mechanism 16, and respectively represent the relative rotating speeds of a second rotary element (second element) RE2 in the form of the first sun gear S1, a first rotary element (first element) RE1 in the form of the first carrier CA1, and a third rotary element (third element)

RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the automatic transmission 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines Y4-Y8 are determined by the gear ratios ρ2, ρ3 and ρ4 of the second, third and fourth planetary gear sets 26, 28, 30. Therefore, as shown in FIG. 3, the distance between the vertical lines corresponding to the sun gear and carrier of each of the second, third and fourth planetary gear sets 26, 28, 30 corresponds to "1", while the distance between the vertical lines corresponding to the carrier and ring gear corresponds to the gear ratio ρ.

Referring to the collinear chart of FIG. 3, the power distributing mechanism 16 (continuously-variable transmission portion) of the drive system 10 is arranged such that the first rotary element RE1 (first carrier CA1) of the first planetary gear set 24, is integrally fixed to the input shaft 14, that is, to the engine 8, and is selectively connected to the second rotary element RE2 (first sun gear S1) through the switching clutch C0, and this rotary element RE2 is connected to the first electric motor M1 and selectively fixed to the casing 12 through the switching brake B0, while the third rotary element RE3 (first ring gear R1) is fixed to the power transmitting member 18 and connected to the second electric motor M2, so that a rotary motion of the differential mechanism input shaft 14 is transmitted to the automatic transmission (step-variable transmission portion) 20 through the power transmitting member 18. A relationship between the rotating speeds of the first sun gear S1 and the first ring gear R1 is represented by an inclined straight line L0 which passes a point of intersection between the lines Y2 and X2.

FIGS. 4 and 5 correspond to a part of the collinear chart of FIG. 3 which shows the power distributing mechanism 16. FIG. 4 shows an example of an operating state of the power distributing mechanism 16 placed in the continuously-variable shifting state with the switching clutch C0 and the switching brake B0 held in the released state. The rotating speed of the first sun gear S1 represented by the point of intersection between the straight line L0 and vertical line Y1 is raised or lowered by controlling the reaction force generated by an operation of the first electric motor M1 to generate an electric energy, so that the rotating speed of the first ring gear R1 represented by the point of intersection between the lines L0 and Y3 is lowered or raised. In the state shown in FIG. 4, the first sun gear S1 has a negative rotating speed, that is, the first electric motor M1 is operated with an electric power supplied thereto. In this state in which the first sun gear S1 has the negative rotating speed, the straight line L0 has a relatively large angle of inclination, so that the first ring gear R1 and the power transmitting member 18 connected to the first ring gear R1 have relatively high rotating speeds, thereby permitting the vehicle to run at a relatively high speed, but deteriorating the fuel economy of the vehicle by an amount corresponding to the amount of electric power supplied to and consumed by the first electric motor M1. In the present drive system 10, however, the automatic transmission 20 is arranged to raise the input rotating speed received from the power transmitting member 18, so that there is a relatively low opportunity in which the first sun gear S1 should have a negative rotating speed. Accordingly, the fuel economy can be improved in the present arrangement, than in the case where the automatic transmission 20 were not able to raise the rotating speed of the power transmitting member 18.

FIG. 5 shows an operating state of the power distributing mechanism 16 placed in the step-variable shifting state with the switching clutch C0 held in the engaged state. When the first sun gear S1 and the first carrier CA1 are connected to each other, the three rotary elements indicated above are rotated as a unit, so that the straight line L0 is aligned with the horizontal line X2, whereby the power transmitting member 18 is rotated at a speed equal to the engine speed $N_E$. When the switching brake B0 is engaged, on the other hand, the rotation of the first sun gear S1 is stopped, so that the straight line L0 is inclined in the state indicated in FIG. 3, whereby the rotating speed of the first ring gear R1, that is, the rotation of the power transmitting member 18 represented by a point of intersection between the lines L0 and Y3 is made higher than the engine speed $N_E$ and transmitted to the automatic transmission 20.

In the automatic transmission 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is integrally fixed to the drive system output shaft 22, while the eighth rotary element RE8 is selectively connected to the power transmitting member 18 through the first clutch C1.

When the first clutch C1 and the third brake B3 are engaged, the automatic transmission 20 is placed in the first-speed position. The rotating speed of the drive system output shaft 22 in the first-speed position is represented by a point of intersection between the vertical line Y7 indicative of the rotating speed of the seventh rotary element RE7 fixed to the drive system output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1. Similarly, the rotating speed of the drive system output shaft 22 in the second-speed position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the drive system output shaft 22. The rotating speed of the drive system output shaft 22 in the third-speed position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the drive system output shaft 22 in the fourth-speed position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the drive system output shaft 22. In the first-speed through fourth-gear positions in which the switching clutch C0 is placed in the engaged state, the eighth rotary element RE8 is rotated at the same speed as the engine speed $N_E$, with the drive force received from the power distributing mechanism 16, that is, from the power distributing mechanism 16. When the switching brake B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth-speed position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22. Further, the rotating speed of the output shaft 22 in the reverse-gear position R established by the engaging actions of the second clutch C2 and third brake B3 is represented by a point of intersection between an inclined straight line LR and the vertical line Y7 indicative of the rotating speed of the seventh rotary element RE7 fixed to the output shaft 222.

FIG. 6 illustrates signals received by an electronic control device 40 provided to control the drive system 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as a shifting control of the automatic transmission 20.

The electronic control device 40 is arranged to receive, from various sensors and switches shown in FIG. 6, various signals such as: a signal indicative of a temperature of cooling water of the engine; a signal indicative of a selected operating position of a shift lever; a signal indicative of the operating speed $N_E$ of the engine 8; a signal indicative of a value indicating a selected group of forward-drive positions of the transmission mechanism; a signal indicative of an M mode (motor-drive mode); a signal indicative of an operated state of an air conditioner; a signal indicative of a vehicle speed corresponding to the rotating speed of the drive system output shaft 22; a signal indicative of a temperature of a working oil of the automatic transmission 20; a signal indicative of an operated state of a side brake; a signal indicative of an operated state of a foot brake; a signal indicative of a temperature of a catalyst; a signal indicative of an angle of operation of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the power distributing mechanism 16 in the fixed-speed-ratio shifting state in which the drive system 10 functions as a step-variable transmission; a signal indicative of a continuously-variable shifting switch provided to place the power distributing mechanism 16 in the continuously variable-shifting state in which the drive system 10 functions as the continuously variable transmission; a signal indicative of a rotating speed $N_{M1}$ of the first electric motor M1; and a signal indicative of a rotating speed $N_{M2}$ of the second electric motor M2. The electronic control device 40 is further arranged to generate various signals such as: a signal to drive an electronic throttle actuator for controlling an angle of opening of a throttle valve; a signal to adjust a pressure of a supercharger; a signal to operate the electric air conditioner; a signal for controlling an ignition timing of the engine 8; signals to operate the electric motors M1 and M2; a signal to operate a shift-range indicator for indicating the selected operating position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 provided to control the hydraulic actuators of the hydraulically operated frictional coupling devices of the power distributing mechanism 16 and the automatic transmission 20; a signal to operate an electric oil pump used as a hydraulic pressure source for the hydraulic control unit 42; a signal to drive an electric heater; and a signal to be applied to a cruise-control computer.

FIG. 7 is a functional block diagram illustrating major control functions performed by the electronic control device 40. Switching control means 50 is arranged to determine whether the vehicle condition is in a continuously-variable shifting region in which the drive system 10 should be placed in the continuously-variable shifting state, or in a step-variable shifting region in which the drive system 10 should be placed in the step-variable shifting state. This determination is made on the basis of a stored predetermined relationship shown in FIG. 8 or 9, for example. Where the relationship shown in FIG. 8 (switching data map) is used, the determination is made on the basis of the vehicle condition as represented by the actual engine speed $N_E$, and a drive-force-related value relating to the drive force of the hybrid vehicle, for example, an engine output torque $T_E$.

According to the relationship shown in FIG. 8, the step-variable shifting region is set to be a high-torque region (a high-output running region in which the output torque $T_E$ of the engine 8 is not lower than a predetermined value TE1, or a high-speed region in which the engine speed $N_E$ is not lower than a predetermined value NE1, namely, a high-vehicle-speed region in which the vehicle speed which is one of the vehicle conditions and which is determined by the engine speed $N_E$ and the overall speed ratio γT is not lower than a predetermined value, or a high-output region in which the vehicle output calculated from the output torque $T_E$ and speed $N_E$ of the engine 8 is not lower than a predetermined value. Accordingly, the step-variable shifting control is effected when the vehicle is running with a comparatively high output torque or speed of the engine 8, or with a comparatively high vehicle output. The step-variable shifting control permits a change of the engine speed $N_E$ as a result of a shift-up action of the transmission, that is, a rhythmic change of the speed of the engine 8. Namely, the continuously-variable shifting state is switched to the step-variable shifting state (fixed-speed-ratio shifting state) when the vehicle is placed in a high-output running state in which a desire of the vehicle operator to increase the vehicle drive force should be satisfied rather a desired to improve the fuel economy. Accordingly, the vehicle operator can enjoy a comfortable rhythmic change of the engine speed $N_E$. On the other hand, the continuously-variable shifting control is effected when the vehicle is running with a comparatively low output torque or speed of the engine 8, or with a comparatively low vehicle output, that is, when the engine 8 is a normal output state. A boundary line defining the step-variable shifting region and the continuously-variable shifting region in FIG. 8 corresponds to a high-vehicle-speed determining line defined by a series of high-vehicle-speed upper limit values, or a high-output running determining line defined by a series of high-output upper limit values.

When the relationship shown in FIG. 9 is used, the above-indicated determination is made on the basis of the actual vehicle speed V and the drive-force-related value in the form of the output torque $T_{OUT}$. In FIG. 9, a broken line indicates a threshold vehicle speed V1 and a threshold output torque T1 which define a predetermined vehicle condition used for switching from the continuously-variable shifting control to the step-variable shifting control, and two-dot chain line indicates a predetermined vehicle condition used for switching from the step-variable shifting control to the continuously-variable shifting control. Thus, there is provided a hysteresis for determination as to whether the shifting state should be switched between the step-variable shifting region and the continuously-variable shifting region. In FIG. 9, a solid line 51 indicates a boundary line defining a motor drive region in which the vehicle is driven by a drive force generated by the electric motor, with a relatively low vehicle output torque or at a relatively low vehicle speed. FIG. 9 also shows a shift boundary data map which uses control parameters in the form of the vehicle speed V and the output torque $T_{OUT}$.

When the switching control means 50 determines that the vehicle condition is in the step-variable shifting region, the switching control means 50 disables a hybrid control means 52 to effect a hybrid control or continuously-variable shifting control, and enables a step-variable shifting control means 54 to effect a predetermined step-variable shifting control. Where the step-variable shifting control means 54 effects the step-variable shifting control according to the determination made on the basis of the relationship of FIG. 8, the step-variable shifting control means 54 effects an automatic shifting control according to a stored predetermined shift boundary data map. Where the determination is made on the basis of the relationship of FIG. 9, the automatic shifting control is effected according to the shift boundary data map shown in FIG. 9.

FIG. 2 indicates the combinations of the operating states of the hydraulically operated frictional coupling devices C0, C1, C2, B0, B1, B2 and B3, which are selectively engaged for effecting the step-variable shifting control. In this automatic step-variable shifting control mode, the first-speed through fourth-speed positions are established by an engaging action of the switching clutch C0, and the power distributing mechanism 16 functions as an auxiliary transmission having a fixed speed ratio of γ0 equal to "1". On the other hand, the fifth-speed position is established by an engaging action of the switching brake B0 in place of the switching clutch C0, and the power distributing mechanism 16 functions as an auxiliary transmission having a fixed speed ratio γ0 equal to about 0.7, for example. That is, the drive system 10 as a whole including the power distributing mechanism 16 functioning as the auxiliary transmission and the automatic transmission 20 functions as a so-called "automatic transmission", in the automatic step-variable shifting control mode.

The drive-force-related value indicated above is a parameter corresponding to the drive force of the vehicle, which may be an output torque $T_{OUT}$ of the automatic transmission 20, an engine output torque $T_E$, or an acceleration value of the vehicle, as well as a drive torque or drive force of drive wheels 38. The engine output torque $T_E$ may be an actual value calculated on the basis of the operating angle of the accelerator pedal or the opening angle of the throttle valve (or intake air quantity, air/fuel ratio or amount of fuel injection) and the engine speed $N_E$, or an estimated value of the required vehicle drive force which is calculated on the basis of the amount of operation of the accelerator pedal by the vehicle operator or the operating angle of the throttle valve. The vehicle drive torque may be calculated on the basis of not only the output torque $T_{OUT}$, etc., but also the ratio of a differential gear device and the radius of the drive wheels 38, or may be directly detected by a torque sensor or the like.

When the switching control means 50 determines that the vehicle condition is in the continuously-variable shifting region, on the other hand, the switching control means 50 commands the hydraulic control unit 42 to release both of the switching clutch C0 and the switching brake B0 for placing the power distributing mechanism 16 in the electrically established continuously-variable shifting state. At the same time, the switching control means 50 enables the hybrid control means 52 to effect the hybrid control, and commands the step-variable shifting control means 54 to select and hold a predetermined one of the gear positions, or to permit an automatic shifting control according to the stored predetermined shift boundary data map. In the latter case, the variable-step shifting control means 54 effects the automatic shifting control by suitably selecting the combinations of the operating states of the frictional coupling devices indicated in the table of FIG. 2, except the combinations including the engagement of the switching clutch C0 and brake B0. Thus, the power distributing mechanism 16 placed in the continuously-variable shifting state under the control of the switching control means 50 functions as the continuously variable transmission while the automatic transmission 20 connected in series to the power distributing mechanism 16 functions as the step-variable transmission, so that the drive system provides a sufficient vehicle drive force, such that the speed of the rotary motion transmitted to the automatic transmission 20 placed in one of the first-speed, second-speed, third-speed and fourth-gear positions, namely, the rotating speed of the power transmitting member 18 is continuously changed, so that the speed ratio of the drive system when the automatic transmission 20 is placed in one of those gear positions is continuously variable over a predetermined range. Accordingly, the speed ratio of the automatic transmission 20 is continuously variable through the adjacent gear positions, whereby the overall speed ratio γT of the drive system 10 as a whole is continuously variable.

The hybrid control means 52 controls the engine 8 to be operated with high efficiency, so as to establish an optimum proportion of the drive forces which are produced by the engine 8, and the first electric motor M1 and/or the second electric motor M2. For instance, the hybrid control means 52 calculates the output as required by the vehicle operator at the present running speed V of the vehicle, on the basis of the operating amount of the accelerator pedal and the vehicle running speed, and calculate a required vehicle drive force on the basis of the calculated required output and a required amount of generation of an electric energy to be stored. On the basis of the calculated required vehicle drive force, the hybrid control means 52 calculates a desired engine speed and a desired total output, and controls the actual output of the engine 8 and the amount of generation of the electric energy by the first electric motor M1, according to the calculated desired total output and engine speed $N_E$. The hybrid control means 52 is arranged to control the shifting action of the automatic transmission 20, while taking account of the presently selected gear position of the automatic transmission 20, so as to improve the fuel economy of the engine 8. In the hybrid control, the power distributing mechanism 16 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the automatic transmission portion 20. That is, the hybrid control means 52 determines a target value of the overall speed ratio γT of the transmission mechanism 10 so that the engine 8 is operated according a stored highest-fuel-economy curve that satisfies both of the desired operating efficiency and the highest fuel economy of the engine 8. The hybrid control means 52 controls the speed ratio γ0 of the differential portion 11, so as to obtain the target value of the overall speed ratio γT, so that the overall speed ratio γT can be controlled within a predetermined range, for example, between 13 and 0.5.

The hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied from the first electric motor M1 to the second electric motor M2 through the inverter 58 and consumed by the second electric motor M2, or supplied from the first electric motor M1 to the electric-energy storage device 60 through the inverter 58 and subsequently consumed by the first electric motor M1. A drive force produced by an operation of the second electric motor M2 or first electric motor M1 with the electric energy generated by the first electric motor M1 is transmitted to the power transmitting member 18. Thus, the transmission mechanism 10 is provided with an electric path through which an electric energy generated by conversion of a portion of a drive force of the engine 8 is converted into a mechanical energy. This electric path includes components associated with the generation of the electric energy and the consumption of the generated electric energy by the second electric motor M2. The hybrid control means 52 can establish a motor-drive mode to drive the vehicle by utilizing the electric CVT function of the power distributing mechanism 16, irrespective of whether the engine 8 is in the non-operated state or in the idling state.

In the above-described arrangements of the switching control means 50, hybrid control means 52 and step-variable shifting control means 54, the power distributing mechanism 16 is placed in the continuously-variable shifting state, assuring a high degree of fuel economy of the vehicle, when the vehicle is in a low- or medium-speed running state or in a low- or medium-output running state, with the engine operated in the normal output state. When the vehicle is in a high-speed running state or at a high speed of operation of the engine 8, on the other hand, the power distributing mechanism 16 is placed in the fixed-speed-ratio shifting state in which the output of the engine 8 is transmitted to the drive wheels 38 primarily through the mechanical power transmitting path, so that the fuel economy is improved owing to reduction of a loss of conversion of the mechanical energy into the electric energy. When the engine 8 is in a high-output state, the power distributing mechanism 16 is placed in the fixed-speed-ratio shifting state. Thus, the power distributing mechanism 16 is placed in the continuously-variable shifting state, only when the vehicle speed or output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first and second electric motors M1, M2, and the required size of the drive system 10 including the electric motors.

FIG. 10 shows an example of a manually operable shifting device in the form of a shifting device 46. The shifting device 46 includes a shift lever 48, which is disposed laterally adjacent to an operator's seat, for example, and which is manually operated to select one of a plurality of positions consisting of: a parking position P for placing the drive system 10 (namely, automatic transmission 20) in a neutral state in which a power transmitting path is disconnected with both of the switching clutch C0 and brake B0 placed in the released state, and at the same time the drive system output shaft 22 of the automatic transmission 20 is in the locked state; a reverse-drive position R for driving the vehicle in the rearward direction; a neutral position N for placing the drive system 10 in the neutral state; an automatic forward-drive shifting position D; and a manual forward-drive shifting position M. The parking position P and the neutral position N are non-driving positions selected when the vehicle is not driven, while the reverse-drive position R, and the automatic and manual forward-drive shifting positions D, M are driving positions selected when the vehicle is driven. The automatic forward-drive shifting position D provides a highest-speed position, and positions "4" through "L" selectable in the manual forward-drive shifting position M are engine-braking positions in which an engine brake is applied to the vehicle.

The manual forward-drive shifting position M is located at the same position as the automatic forward-drive shifting position D in the longitudinal direction of the vehicle, and is spaced from or adjacent to the automatic forward-drive shifting position D in the lateral direction of the vehicle. The shift lever 48 is operated to the manual forward-drive shifting position M, for manually selecting one of the positions "D" through "L". Described in detail, the shift lever 48 is movable from the manual forward-drive shifting position M to a shift-up position "+" and a shift-down position "−", which are spaced from each other in the longitudinal direction of the vehicle. Each time the shift lever 92 is moved to the shift-up position "+" or the shift-down position "−", the presently selected position is changed by one position. The five positions "D" through "L" have respective different lower limits of a range in which the overall speed ratio γT of the drive system 10 is automatically variable, that is, respective different lowest values of the overall speed ratio γT which corresponds to the highest output speed of the drive system 10. Namely, the five positions "D" through "L" select respective different numbers of the speed positions or gear positions of the automatic transmission 20 which are automatically selectable, so that the lowest overall speed ratio γT available is determined by the selected number of the selectable gear positions. The shift lever 48 is biased by biasing means such as a spring so that the shift lever 48 is automatically returned from the shift-up position "+" and shift-down position "−" back to the manual forward-drive shifting position M. The shifting device 46 is provided with shift-position sensors operable to detect the presently selected position of the shift lever 48, so that signals indicative of the presently selected operating position of the shift lever 48 and the number of shifting operations of the shift lever 48 in the manual forward-shifting position M are supplied to the electronic control device 40.

When the shift lever 46 is operated to the automatic forward-drive shifting position D, for example, the switching control means 50 effects an automatic switching control of the drive system 10, and the hybrid control means 52 effects the continuously-variable shifting control of the power distributing mechanism 16, while the step-variable shifting control means 54 effects an automatic shifting control of the automatic transmission 20. When the drive system 10 is placed in the step-variable shifting state, for example, the shifting action of the drive system 10 is automatically controlled to select an appropriate one of the first-gear position through the fifth-gear position indicated in FIG. 2. When the drive system 10 is placed in the continuously-variable shifting state, the speed ratio of the power distributing mechanism 16 is continuously changed, while the shifting action of the automatic transmission 20 is automatically controlled to select an appropriate one of the first-gear through fourth-gear positions, so that the overall speed ratio γT of the drive system 10 is controlled so as to be continuously variable within the predetermined range. The automatic forward-drive position D is a position selected to establish an automatic shifting mode (automatic mode) in which the drive system 10 is automatically shifted.

When the shift lever 48 is operated to the manual forward-drive shifting position M, on the other hand, the shifting action of the drive system 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the positions "D" through "L". When the drive system 10 is placed in the step-variable shifting state, for example, the shifting action of the drive system 10 is automatically controlled within the above-indicated predetermined range of the overall speed ratio γT. When the drive system 10 is placed in the continuously-variable shifting state, the speed ratio of the power distributing mechanism 16 is continuously changed, while the shifting action of the automatic transmission 20 is automatically controlled to select an appropriate one of the gear positions the number of which is determined by the manually selected one of the positions "D" through "L", so that the overall speed ratio γT of the drive system 10 is controlled so as to be continuously variable within the predetermined range. The manual forward-drive position M is a position selected to establish a manual shifting mode (manual mode) in which the selectable gear positions of the drive system 10 are manually selected.

FIG. 11 is a cross sectional view of the drive system 10, and FIG. 12 is a cross sectional view of a first unit (first power transmitting portion) 70 of the drive system 10, while FIG. 13 is an enlarged cross sectional view of a second unit (second power transmitting portion) 100.

As shown in FIG. 11, the casing 12 consists of a first casing 12a which is a casing of a first unit 70, and a second casing 12b which is a casing of a second unit 100. The first casing 12a accommodates the first electric motor M1 and the power distributing mechanism (first gear device) 16, while the second casing 12b accommodates the second electric motor M2 and the automatic transmission (second gear device) 20.

As shown in FIG. 12, the first casing 12a has a generally cylindrical outer shape. A portion of the first casing 12a in which the power distributing mechanism 16 is accommodated has a substantially constant outside diameter, while a portion of the first casing 12a in which the first electric motor M1 is accommodated has an outside diameter which increases in an axial direction toward the engine 8 (in the left direction as seen in FIG. 11). The first casing 12a is open at its opposite axial ends, and has an integrally formed first support wall 72 functioning as a wall portion, which is located between the power distributing mechanism 16 and the first electric motor M1. The first support wall 72 extends substantially perpendicularly to the input shaft 14, and divides the interior space of the first casing 12a into a first accommodating space 74 which is located on the side of the engine 8 and which accommodates the first electric motor M1, and a second accommodating chamber 76 which is located remote from the engine 8 and which accommodates the power distributing mechanism 16. The first electric motor M1 is installed into the first accommodating chamber 74 in the right direction as seen in FIG. 11, while the power distributing mechanism 16y is installed into the second accommodating chamber 76 in the left direction.

The first casing 12a has an annular extension 78 extending in the axial direction of the input shaft 14 toward the engine 8, so that the first accommodating chamber 74 has a substantially constant inside diameter. A lid plate 80 is fixed at its radially outer end to the annular extension 78.

The first electric motor M1 consists of a first stator 82, a first rotor 84, and a first rotor support shaft 86 formed integrally with the first rotor 84. The first rotor support shaft 86 is supported at one end thereof by the first support wall 72 through a bearing 88, and at the other end by the lid plate 80 through a bearing 90. The first sun gear S1 has an integrally formed sun gear shaft 92, which extends through a center bore in the first support wall 72 into an end portion of the first rotor support shaft 86. The sun gear shaft 92 has a spline 93 formed on an end portion thereof on the side of the first rotor support shaft 86, and is fitted at this end portion in the end portion of the first rotor support shaft 86 on the side of the first support wall 72, so that the sun gear shaft 2 and the first rotor support shaft 86 are rotated as a unit.

The input shaft 14 is supported at the axis of the first casing 12a, rotatably relative to the first rotor support shaft 86 and the sun gear shaft 92, by a bushing 97 disposed in the sun gear shaft 92 at an axial position of the bearing 88, a bearing 98 disposed in the first rotor support shaft 86 at an axial position of the bearing 90, and a bushing 99 disposed in the first sun gear S1. The input shaft 14 has an end portion connected to the first carrier CA1, and therefore functions as an input shaft of the first planetary gear set 24.

An annular plate 94 is fixed to the inner circumferential surface of an axial end portion of the first ring gear R1 of the first planetary gear set 24, which axial end portion is located on the side of the second unit 100. The annular plate 394 is neither axially movable nor rotatable relative to the first ring gear R1, is perpendicular to the axis of the input shaft 14, and has a center hole. The first planetary gear set 24 has an output shaft 96 which is an output shaft of the power distributing mechanism 16. The output shat 96 has a shaft portion 96a in the form of a sleeve extending toward the second unit 100, and a flange portion 96b extending radially from an end of the shaft portion 96a on the side of the first planetary gear set 24. The flange portion 96b is welded to the annular plate 94, so that the output shaft 96 and the annular plate 94 are rotated as a unit. The shaft portion 96a has spline teeth 96c formed in its inner circumferential surface. The switching clutch C0 is disposed between the first support wall 72 and the first planetary gear set 24, while the switching brake B0 is disposed radially outwardly of the first planetary gear set 24.

Then, the second unit 100 will be described. As shown in FIG. 11, the second casing 12b is open at an end on the side of the first unit 70, and has a diameter (outside and inside diameters) which decreases in steps in the axial direction toward the output shaft 22. The second casing 12b accommodates the automatic transmission 20 in its portion having the relatively small diameter, and the second electric motor M2 in its portion on the side of the open end. Coaxially with the second casing 12b, there are disposed the output shaft 22, and an intermediate shaft 102 and an input shaft 104 of the automatic transmission 20, in this order of description in the axial direction from the closed end toward the open end, such that the output shaft, intermediate shaft 102 and input shaft 104 are rotatable relative to each other. The end portion of the input shaft 104 on the side of the closed end of the second casing 102b is located near the end of the automatic transmission 20 on the side of the second electric motor M2, while the other end portion of the input shaft 104 is located near the open end of the second casing 102b. The output shaft 22 is rotatable with the fourth carrier CA4 of the fourth planetary gear set 30 (not shown in FIG. 11), and the intermediate shaft 102 is rotatable with the third ring gear R3 of the third planetary gear set 28 (not shown in FIG. 11) and the fourth sun gear S4 of the fourth planetary gear set 30. In this respect, reference is made to FIG. 1.

As shown in FIG. 13 which is an enlarged view of the second unit 100, a second support wall 106 is located between the automatic transmission 20 and the second electric motor M2. the second support wall 106 has a radially inner cylindrical portion 106a extending coaxially with the input shaft 104, a connecting portion 106b radially extending from one end of the sleeve portion 106a on the side of the second electric motor M2, and a radially outer cylindrical portion 106c which extends axially from the radially outer end of the connecting portion 106b toward the second electric motor M2 and which has a comparatively large radial wall thickness. This second support wall 106 has a shoulder portion held in abutting contact with a stepped portion of the second casing 12b. Namely, the radially outer cylindrical portion 106c of the second support wall 106 is held at its outer circumferential surface in abutting contact with a first abutting surface 108 in the form of an inner circumferential surface of the second casing 12b, and is fixed to the second casing 12b with screws 118. Before the radially outer cylindrical portion 106c is fixed to the second casing 12b with the screws 118, the radially outer cylindrical portion 106c is sidable at its outer circumferential surface on the first abutting surface 108. Accordingly, the second support wall 106 can be fixedly fitted in the second casing 12b, without a press fit.

The radially outer cylindrical portion 106c has an end face at its axial end remote from the second electric motor M2. This end face is held in abutting contact with a first radial surface 109 of the second casing 12b which extends radially inwardly from one end of the first abutting surface 108 remote from the second electric motor M2. Thus, the second support wall 106 is fitted in the second casing 12b with a high degree of accuracy of axial and radial positioning relative to the second casing 12b, with the outer circumferential surface and end face of the second support wall 106 held in abutting contact with the first abutting surface 108 and the first radial surface 109 of the second casing 12b. The input shaft 104 is supported at its end portion on the side of the automatic transmission 20, by a bearing 111 disposed in the radially inner cylindrical portion 106a of the second support wall 106, such that the input shaft 104 is rotatable relative to the radially inner cylindrical portion 106a.

The second electric motor M2 consists of a second stator 112, a second rotor 114, and a second rotor support shaft 116 which is rotatable with the second rotor 114. The second stator 112 is fixed to the second casing 12b, with the screws which extend through the second stator 112 and the radially outer cylindrical portion 106c of the second support wall 106 in the axial direction and which are screwed in the second casing 12b. The second rotor support shaft 116 is supported at an end portion thereof on the side of the automatic transmission 20, by the second casing 12b via a bearing 120 which is held at its outer circumferential surface in abutting contact with the inner circumferential surface of the radially inner cylindrical portion 106a of the second support wall 106.

A third support wall 122 functioning as the other support wall is disposed on one side of the second electric motor M2 on the side of the open end of the second casing 12b. This third support wall 122 has a shoulder portion held in abutting contact with a steooed portion of the second casing 12b. Namely, the third support wall 122 is held at its outer circumferential surface in abutting contact with a second abutting surface 123 in the form of an inner circumferential surface of the second casing 12b, and is fixed to the second casing 12b with screws 124. The second abutting surface 123 is located nearer to the open end of the second casing 12b than and radially outwardly of the first abutting surface 108, Before the third support wall 122 is fixed to the second casing 12b with the screws 124, the third support wall 122 is slidable at its outer circumferential surface on the second abutting surface 123. The third support wall 122 has an end face at its axial end on the side of the second electric motor M2. This end face is held in abutting contact with a second radial surface 125 of the second casing 12b which extends radially inwardly from one end of the second abutting surface 123 on the side of the second electric motor M2. Thus, the third support wall 122 is fitted in the second casing 12b with a high degree of accuracy of axial and radial positioning relative to the second casing 12b, with the outer circumferential surface and end face of the third support wall 122 held in abutting contact with the second abutting surface 123 and the second radial surface 125 of the second casing 12b. The input shaft 104 is supported at its end portion on the side of the automatic transmission 20, by a bearing 111 disposed in the radially inner cylindrical portion 106a of the second support wall 106, such that the input shaft 104 is rotatable relative to the radially inner cylindrical portion 106a.

The third support wall 122 is fixed to the second casing 12b with the screws 124, and has an axial through-hole 126 at a radially central portion thereof. The input shaft 104 extends toward the first unit 70, having an axial extension 104a extending through the second rotor support shaft 116 and the through-hole 126 into the first unit 70. The axial extension 104a has spline teeth 104b formed on the outer circumferential surface of an axial portion thereof corresponding to the through-hole 126.

The third support wall 122 has a protruding portion 122a which is located radially inwardly of the second stator 112 and which protrudes toward the second rotor 114. A bearing 128 is held at its outer circumferential surface in abutting contact with the inner circumferential surface of the protruding portion 122a. The second rotor support shaft 116 is supported at an end portion thereof remote from the second support wall 106, by the third support wall 122 via the bearing 128. The second rotor support shaft 116 supports, at its end portion on the side of the third support wall 122, the input shaft 104 via a bearing 130 disposed radially inwardly of the bearing 128, and is rotated with the input shaft 104 through a spline 132 formed at the other end portion.

The components of the second unit 100 described above are installed into the second casing 12b, in the order in which the components are arranged in the axial direction from the closed end toward the open end of the second casing 12b. The first unit 70 and the second unit 100 are assembled together, such that the spline teeth 96c of the output shaft 96 of the first unit 70 and the spline teeth 104b of the input shaft 104 of the second unit 100 are held in meshing engagement with each other, whereby the drive system 10 shown in FIG. 11 is manufactured. It is noted that the power transmitting member 18 shown in FIG. 1 is constituted by the output shaft 96 and the input shaft 104 which are splined to each other and rotated as a unit.

In the present embodiment described above, the individually prepared first and second units 70, 100 are assembled together into the drive system 10 such that the output shaft 96 of the power distributing mechanism 16 and the input shaft 104 of the automatic transmission 20 are connected to each other. Accordingly, the drive system 10 has an improved efficiency of assembling.

In particular, the output shaft 96 of the power distributing mechanism 16 and the input shaft 104 of the automatic transmission 20 can be easily connected to each other by spline coupling to each other, so that the efficiency of assembling of the present drive system 10 is further improved.

The present embodiment is further arranged such that the automatic transmission 20, second support wall 106 and second electric motor M2 are arranged in this order of description, and such that the input shaft 104 of the automatic transmission is supported by the second support wall 106 and the second rotor support shaft 116 of the second electric motor M2, which are installed in this order, so that the assembling efficiency is improved.

The present embodiment is further arranged such that the outer circumferential surface of the second support wall 106 is held in abutting contact with an inner circumferential surface in the form of the first abutting surface 108 of the second casing 12b, so that the second support wall 106 is accurately positioned in the radial direction. In addition, the third support wall 122 is also held in abutting contact with another inner circumferential surface in the form of the second abutting surface 123 of the second casing 12b, so that the third support wall 122 is accurately positioned in the radial direction. Further, the second rotor support shaft 116 of the second electric motor M2 is supported at its opposite ends by the second support wall 106 and the third support wall 122, so that the second rotor support shaft 116 of the second electric motor M2 is also accurately positioned in the radial direction. Further, the input shaft 104 of the automatic transmission 20 is supported by the second rotor support shaft 116 and the second support wall 106, so that the input shaft 104 is also accurately positioned in the radial direction. Accordingly, the drive system 10 in which the input shaft 104 and the power distributing mechanism 16 must be connected to each other can be easily assembled, and the input shaft 104 and the output shaft 96 can be stably rotated as a unit.

Referring to the cross sectional view of FIG. 14, there is shown the output shaft 22 of the drive system 10 constructed according to a second embodiment of this invention. At one end of the output shaft 22, there is disposed the fourth planetary gear set 30 including the fourth sun gear S4, fourth planetary gear P4, fourth carrier CA4 and fourth ring gear R4. The output shaft 22 is provided with a cylindrical end portion 22a formed at its end at which the fourth planetary gear set 30 is disposed. The cylindrical end portion 22a has an outside diameter larger than that of the other portion of the output shaft 22, and a hole 270 formed therethrough in the axial direction. The cylindrical end portion 22a is provided at its open end with a radially outwardly extending flange portion 22b. The fourth carrier CA4 is fixedly mounted on the outer circumferential surface of the flange portion 22b, and an intermediate shaft 272 rotated with the fourth sun gear S4 is rotatably fitted in the cylindrical end portion 22a. A thrust bearing 273 is interposed between the fourth sun gear S4 and the flange portion 22b.

A plurality of friction discs 274 of the third brake B3 are splined to an outer circumferential surface of the fourth ring gear R4. The plurality of friction discs 274 and pressure plates 276 are alternately arranged, and the pressure plates 276 are splined to an inner circumferential surface of the casing 12. A portion of the casing 12 in which the output shaft 22 is accommodated has a first cylindrical portion 12a to which the pressure plates 276 are splined, an annular connecting portion 12b extending radially inwardly from one end of the first cylindrical portion 12a, and a second cylindrical portion 12c extending from a radially inner end of the connecting portion 12b in an axial direction away from the first cylindrical portion 12a.

The casing 12 has a sliding wall 278 extending in parallel with the second cylindrical portion 12c in the axial direction away from the second cylindrical portion 12c, from a point of connection between the second cylindrical portion 12c and the connecting portion 12b. This sliding wall 278 cooperates with the first cylindrical portion 12a and the connecting portion 12b to define an accommodating chamber 280 which is open toward the friction discs 274. A brake piston (piston member) 282 is received in the accommodating chamber 280, such that the brake piston 282 is slidable on the sliding wall 278 and the first cylindrical portion 12a. A spring holder plate 283 is fitted on an outer circumferential surface (opposed to the first cylindrical portion 12a) of an open end portion of the sliding wall 278, such that the spring holder plate 283 is not movable toward the fourth planetary gear set 30. Between this spring holder plate 283 and the brake piston 282, there is disposed a return spring 284. When the brake piston 282 is moved against a biasing force of the return spring 284, the pressure plates 276 and the friction discs 274 are forced against each other by the brake piston 282, for frictional contact with each other, whereby a rotary motion of the fourth ring gear R4 is prevented.

The output shaft 22 has an axial hole 286 formed coaxially with the above-described hole 270 and open at one end thereof to the hole 270, and a first radial hole 288 and a second radial hole 290 which are formed in the radial direction, in communication with the axial hole 286. The first radial hole 288 is located at a radial portion close to the radial position of the connecting portion 12b, while the second radial hole 290 is located on side of the first radial hole 288 which is on the side of the drive wheels 38. The axial hole 286 and first and second radial holes 288, 290 cooperate to function as a lubrication passage, and the first and second radial holes 288, 290 are both open in the outer circumferential surface of the output shaft 22.

The output shaft 22 further has a stepped portion 22 formed between the first and second radial holes 288, 290, and an annular spacer member 292 is held at one end face in abutting contact with a side surface of the stepped portion 22. The spacer member 292 has concave outer and inner circumferential surfaces, and the second radial hole 290 is opposed to the concave inner circumferential surface of the spacer member 292.

A bearing 294 functioning as a support member is disposed on one side of the spacer member 292 which is remote from the stepped portion 22c. The output shaft 22 is rotatably supported by the casing 12 via the bearing 294. Portions of the second cylindrical portion 12c and the sliding wall 278 of the casing 1 which are close to each other have a radially protruding thick-walled portion 296, which is provided with a bearing 298 supporting the output shaft 22.

The thick-walled portion 296 has an annular groove 300 formed in the inner circumferential surface at its axial end on the side of the bearing 294, such that the annular groove 300 is opposed to the bearing 294. At least one axial groove 302 is formed in the inner circumferential surface of the sliding wall 278 which defines the inside diameter of the accommodating chamber 280, and in the thick-walled portion 296, such that the axial groove 302 extends in the axial direction and is open at one axial end toward the bearing 294 and at the other axial end toward a spacer 304 which is fitted in the inner circumferential surface of the sliding wall 278 such that the spacer 304 is held in abutting contact with an end face 302a of the sliding wall 278 formed at the above-indicated other axial end of the axial groove 302. Preferably, a plurality of axial grooves 302 are formed such that the axial grooves 302 are spaced apart from each other in the circumferential direction of the sliding wall 279.

A thrust bearing 306 is interposed between the spacer 304 and the flange portion 22b of the output shaft 22. When a thrust force acts on the fourth sun gear S4 in the axial direction toward the thrust bearing 306 during rotation of the fourth planetary gear P4, this thrust force is transmitted to the end face 302a at the axial end of the axial groove 302 on the side of the fourth planetary gear set 30, through the thrust bearing 273, flange portion 22b of the output shaft 2, thrust bearing 306 and spacer 304. Thus, the end face 302a functions as a thrust-force bearing surface.

The output shaft 22 has spline teeth 308 formed in the outer circumferential surface of an axial portion on one side of the second radial hole 290 on the side of the drive wheels 38. The spline teeth 308 have an axial end at an axially intermediate position (concave portion) of the spacer member 292. On the axial portion of the output shaft 22 on which the spline teeth 308 are formed, there is press-fitted a cylindrical portion 310 of a flange member, such that the cylindrical portion 310 is held at its end face in abutting contact with one side face of the thrust bearing 294. The flange member having the cylindrical portion 310 is prevented from being moved in the axial direction toward the drive wheels 38, by a lock nut 312 fixedly mounted on the output shaft 22 at an axial position on one side of the cylindrical portion 310 on the side of the drive wheels 38.

A lip seal 314 is interposed between the outer circumferential surface of the output shaft 22 and the inner circumferential surface of the cylindrical portion 310, such that the lip seal 314 is located adjacent to the axial end of the spline teeth 308 on the side of the drive wheels 38. Another slip seal 316 is interposed between the outer circumferential surface of the cylindrical portion 310 and the inner circumferential surface of the second cylindrical portion 12c of the casing 12, such that the lip seal 316 is located on one side of the bearing 294 on the side of the drive wheels 38. A dust cover 318 is fitted on the outer circumferential surface of the cylindrical portion 310, such that the dust cover 318 is located on one side of the lip seal 316 on the side of the drive wheels 38.

In the drive system 10 constructed as described above according to the second embodiment of the invention, a lubricating oil is introduced from the axial hole 286 of the output shaft 22 into an annular recess defined by the concave inner circumferential surface of the spacer member 292, through the second radial hole 290, and is supplied from the recess to the bearing 294 through the spline teeth 308, for lubricating the bearing 294. The lubricating oil used to lubricate the bearing 294 is fed through the annular groove 300 opposed to the bearing 294, and the at least one axial groove 302, and discharged from the axial end of the axial groove 302 on the side of the fourth planetary gear set 30.

In the fragmentary cross sectional view of FIG. 15, there is shown a passage through which the lubricating oil is delivered to the axial hole 286 of the output shaft 22 of the drive system 10. As shown in FIG. 15, the intermediate shaft 272 has an end portion remote from the output shaft 22, and this axial end portion is rotatably fitted in an end portion of an input shaft 319 of the automatic transmission 20. The input shaft 319 is rotatably supported by the casing 12 via a support wall 320. The support wall 320 has a first lubricating hole 322 and a second lubricating hole 324 to which the lubricating oil is delivered from a regulator valve not shown. The second lubricating hole 324 is held at its end remote from the first lubricating hole 322 in communication with an oil groove 326 formed in the inner circumferential surface of the support wall 320. The input shaft 319 has a radial oil hole 328 open to an end portion of the oil groove 326 on the side of the second lubricating oil 324, and an axial oil hole 330 which is held at one end thereof in communication with the first oil hole 328 and open at the other end in the end face of the input shaft 319 on the side of the intermediate shaft 272. The intermediate shaft 272 has a through-hole 332 formed therethrough.

In the arrangement described above, the lubricating oil introduced from a secondary regulator valve (not shown) into the first lubricating hole 322 of the support wall 320 is fed into the axial hole 286 of the output shaft 22 through the second lubricating hole 324, oil groove 326, oil holes 328, 330 of the input shaft 319, and through-hole 332 of the intermediate shaft 272.

In the present embodiment, the axial groove 302 formed in the inner circumferential surface of the sliding wall 278 defining the accommodating chamber 280 is open at one end thereof toward the bearing 294 supporting the output shaft 22, so that the lubricating oil which has lubricated the bearing 294 is discharged through the axial groove 302. Further, the axial groove 302 is formed in the sliding wall 278 which defines the accommodating chamber 280 accommodating the brake piston 28, so that the weight of the sliding wall 278 and consequently the weight of the drive system 10 can be reduced.

The present embodiment is further arranged such that the end face 302a adjacent to the end of the axial groove 302 on the side of the fourth planetary gear set 30 functions to receive the thrust force of the fourth sun gear S4 of the fourth planetary gear set 30, making it possible to eliminate a need for providing an additional member for receiving the thrust force of the fourth sun gear S4, thereby reducing the weight of the drive system 10.

Referring to the fragmentary cross sectional view of FIG. 16, there is shown the drive system 10 constructed according to a third embodiment of the invention. As shown in FIG. 16, the casing 12 of the drive system 10 consists of the first casing 12a accommodating the first electric motor M1 and the power distributing mechanism 16, and the second casing 12b accommodating the second electric motor M2 and the automatic transmission 20 not shown. The first casing 12a, and the first electric motor M1 and power distributing mechanism 16 accommodated in the first casing 12a constitute a first unit 370, while the second casing 12b, and the second electric motor M2 and automatic transmission 20 accommodated in the second casing 12b constitute a second unit 400.

The first casing 12a has a generally cylindrical outer shape. A portion of the first casing 12a in which the power distributing mechanism 16 is accommodated has a substantially constant outside diameter, while a portion of the first casing 12a in which the first electric motor M1 is accommodated has an outside diameter which increases in an axial direction toward the engine 8 (in the left direction as seen in FIG. 16). The first casing 12a is open at its opposite axial ends, and has an integrally formed first support wall 372, which is located between the power distributing mechanism 16 and the first electric motor M1. The first support wall 372 has a radial wall portion 372a in the form of a circular disc substantially perpendicular to the input shaft 14, a cylindrical portion 372b extending from the radially inner end of the radial wall portion 372a in the axial direction toward the first planetary gear set 324, and a protruding portion 372c protruding from a radially inner portion of the side surface of the radial wall radial wall portion 372a on the side of the first electric motor M1, in the axial direction toward the first electric motor M1. The cylindrical portion 372b has a central through-hole 373 extending therethrough in the axial direction. The first support wall 373 divides the interior space of the first casing 12a into a first accommodating space 374 which is located on the side of the engine 8 and which accommodates the first electric motor M1, and a second accommodating chamber 376 which accommodates the power distributing mechanism 16. The first electric motor M1 is installed into the first accommodating chamber 374 in the right direction as seen in FIG. 16, while the power distributing mechanism 16y is installed into the second accommodating chamber 376 in the left direction.

The first casing 12a has an annular extension 378 extending in the axial direction of the input shaft 14 toward the engine 8, so that the first accommodating chamber 374 has a substantially constant inside diameter. A lid plate 380 is fixed at its radially outer end to the annular extension 378.

The first electric motor M1 consists of a first stator 382, a first rotor 384, and a first rotor support shaft 386 (a hub of the first rotor 384) formed integrally with the first rotor 384. The first support wall 372 functions as a support member, and the first rotor support shaft 386 is supported at one end thereof by the protruding portion 372c of the first support wall 372 (which is a part of the first casing 12a), via a bearing 388, and at the other end by the first casing 12a via a bearing 390 and the lid plate 380 fixed to the first casing 12a.

A sun gear shaft 392 is formed integrally with the first sun gear S1, and an end portion of the sun ear shaft 392 extends into an end portion of the first rotor support shaft 386 on the side of the first support wall 372, through the through-hole 373, that is, through the cylindrical portion 372b of the first support wall 372. The input shaft 14 extends through the first rotor support shaft 386 and the sun gear shaft 392 coaxially with the first casing 12a, such that the input shaft 14 is rotatable relative to the first rotor support shaft 386 and the sun gear shaft 392. The input shaft 14 is fixed at one end thereof to the first carrier CA1, so that an output of the engine 8 (not shown in FIG. 16) is transmitted to the first carrier CA1 through the input shaft 14.

An annular plate 394 is fixed to the inner circumferential surface of an axial end portion of the first ring gear R1 of the first planetary gear set 324, which axial end portion is located on the side of the second unit 400. The annular plate 94 is neither axially movable nor rotatable relative to the first ring gear R1, is perpendicular to the axis of the input shaft 14, and has a center hole. The first planetary gear set 324 has an output shaft 396 which is an output shaft of the power distributing mechanism 16. The output shat 396 has a shaft portion 396a in the form of a sleeve extending toward the second unit 400, and a flange portion 396b extending radially from an end of the shaft portion 396a on the side of the first planetary gear set 324. The flange portion 396b is welded to the annular plate 394, so that the output shaft 396 and the annular plate 394 are rotated as a unit. The switching clutch C0 is disposed between the first support wall 372 and the first planetary gear set 324, while the switching brake B0 is disposed radially outwardly of the first planetary gear set 324.

The second electric motor M2 includes a second stator 402, a second rotor 404, and a second rotor support shaft 406 rotated with the second rotor 404. Adjacent to an open end of the second casing 12b on the side of the first casing 12a, there is disposed a second support wall 408, which is fixed to the second casing 12b with screws 410. The second support wall 408 has a radially central through-hole 412 extending in the radial direction. The second support wall 408 further has a protruding portion 408a which is located radially inwardly of a coil 402a of the second stator 402 and which protrudes toward the second rotor 404. A bearing 414 is held in abutting contact with the inner circumferential surface of the protruding portion 408a.

The second rotor shaft 406 is supported at one end portion thereof by the second support wall 408 via the bearing 414. The second rotor support shaft 406 supports, at its end portion on the side of the second support wall 408, an input shaft 418 of the automatic transmission 20, via a bearing 416 disposed radially inwardly of the bearing 414. The input shaft 418 extends through the through-hole 412 into the first unit 370, and is splined to the output shaft 396 of the first planetary gear set 324, at an axial portion corresponding to the through-hole 412. It is noted that the power transmitting member 18 shown in FIG. 1 is constituted by the input shaft 418 and the output shaft 396 which are splined to each other for rotation as a unit.

The end portion of the input shaft 418 on the side of the first unit 370 extends into the end portion of the input shaft 14 on the side of the second unit 400, and the end portion of the input shaft 14 on the side of the second unit 400 is supported by the input shaft 418 via a bearing 420 disposed radially inwardly of the first sun gear S1 and between the input shaft 44 and the input shaft 418. This input shaft 418 is supported by the second casing 12b via the bearing 416, second rotor support shaft 406, bearing 414 and second support wall 408, so that the end portion of the input shaft 14 on the side of the second unit 400 is supported by the second casing 12b via the above-indicated members 420, 418, 416, 406, 414 and 408. Further, the input shaft 14 is supported by the first rotor support shaft 386 via a bearing 422 interposed between the input shaft 14 and the inner circumferential surface of the end portion of the first rotor support shaft 386 on the side of the lid plate 380, and the first rotor support shaft 386 is supported by the first casing 12a via the bearing 390 and the lip plate 380, so that the input shaft 14 is supported by the first casing 12a via the above-indicated members 422, 386, 390 and 380. Thus, the input shaft 14 is supported by the casing 12, at the two axial portions, which are spaced apart from each other in the axial direction by a comparatively large distance, so that the input shaft 14 is accurately positioned in the radial direction.

FIG. 17 is an enlarged view of the power distributing mechanism 16. The first sun gear S1 is supported by the input shaft 14 via a bearing 424 interposed between the first sun gear S1 and the input shaft 14. The end portion of the sun gear shaft 392 formed integrally with the first sun gear S1 extends into the first rotor support shaft 386, and is provided with a spline (splined portion) 426 meshing with the first rotor support shaft 386, so that the first rotor support shaft 386 and the sun gear shaft 392 are rotated as a unit. A bearing 428 is interposed between the inner circumferential surface of the splined portion 426 of the sun gear shaft 392 and the input shaft 14, and the sun gear shaft 392 is supported at the splined portion 426 by the input shaft 14 via the bearing 428. Thus, the first sun gear S1 and the sun gear shaft 392 formed integrally with the first sun gear S1 are supported by the input shaft 14 at two axial positions via the bearings 424, 428. Since the input shaft 14 is accurately positioned in the radial direction, as described previously, the first sun gear S1 and the sun gear shaft 392 are also accurately positioned in the radial direction.

The switching clutch c0 includes a clutch cylinder 430 mounted on the cylindrical portion 372b of the first support wall 372, a clutch piston 432 accommodated in the clutch cylinder 430, and a plurality of pressure plates 434 and a plurality of friction discs 346 which are forced against each other by the clutch piston 432, for frictional contact with each other. The clutch cylinder 430 includes a bottom portion 430a parallel to the radial wall portion 372a of the first support wall 372, a radially inner cylindrical portion 372b extending from the radially inner end of the bottom portion 430a and mounted on the cylindrical portion 372b of the first support wall 372, and a radially outer cylindrical portion 430c extending from the radially outer end of the bottom portion 430a. The clutch cylinder 430 cooperates with the clutch piston 432 accommodated therein, to define an oil chamber 432 between the bottom portion 430a of the clutch cylinder 430 and the clutch piston 432.

The sun gear shaft 392 includes a radially projecting portion 392a radially extending toward the radially inner cylindrical portion 430b of the clutch cylinder 430. The radially projecting portion 392a has an outer circumferential surface which is located radially outwardly of the first sun gear S1 and which is welded with a weld 437 to the inner circumferential surface of the radially inner cylindrical portion 430b of the clutch cylinder 430 of the switching clutch C0. Thus, the first sun gear S1 formed integrally with the sun gear shaft 392 and the clutch cylinder 430 are formed integrally with each other. Since the first sun gear S1 and the sun gear shaft 392 are accurately positioned in the radial direction as described above, the clutch cylinder 430 is also accurately positioned in the radial direction. Further, since the clutch cylinder 430 and the sun gear shaft 392 are welded together, the required axial dimension of the connecting portion of these two members and a radial play between the two members can be made smaller, than in the case where the two members are splined to each other.

A thrust bearing 438 is provided between a side surface of the radially projecting portion 392a of the sun gear shaft 392 and an end face of the cylindrical portion 372b of the first support wall 372 opposed to the radially projecting portion 392a. A thrust force acting on the first sun gear S1 in the axial direction toward the first electric motor M1 is received by the first support wall 372 through the thrust bearing 438. Since the sun gear shaft 392 and the first rotor support shaft 386 are coupled together through the splined portion 426, the thrust force acting on the first sun gear S1 in the axial direction toward the first electric motor M1 is not transmitted to the first rotor support shaft 386. A thrust force acting on the first sun gear S1 in the opposite axial direction is received by the input shaft 14 integral with the first carrier CA1, through a thrust bearing 439 interposed between a side surface of the first sun gear S1 and a side surface of the first carrier CA1.

The plurality of pressure plates 434 are splined to the inner circumferential surface of the radially outer cylindrical portion 430c of the clutch cylinder 430. A retainer ring 440 is fixedly fitted in the inner circumferential surface of the radially outer cylindrical portion 430c, at an axial position between the open end of the clutch cylinder 430 and the pressure plate 434 nearest to the open end. On the other hand, the plurality of friction discs 436 disposed alternately with respect to the pressure plates 434 are splined to the outer circumferential surface of a clutch hub 441 which extends from the radially outer end of the first carrier CA1 in the axial direction toward the clutch piston 432. A radially extending spring holder plate 442 is fitted on the outer circumferential surface of the radially inner cylindrical portion 430b of the clutch cylinder 430, at an axial position corresponding to an open end portion of the clutch cylinder 430 which is located radially inwardly of the clutch hub 441. The spring holder plate 442 is immovable in the axial direction toward the first planetary gear set 24. A return spring 444 is interposed between the spring holder plate 442 and the clutch piston 432.

The first support wall 372 has an oil passage system for supplying a working oil to the oil chamber 435 of the switching clutch C0 constructed as described above. Namely, the radial wall portion 372a of the first support wall 372 has a first radial oil passage 446, and the cylindrical portion 372b of the first support wall 372 has an axial oil passage 448 communicating at one end thereof with the first radial oil passage 446, and a second radial oil passage 450 communicating at one end thereof with the axial oil passage 448 and open at the other end in the outer circumferential surface of the cylindrical portion 372b. The radially inner cylindrical portion 430b of the clutch cylinder 430 has a third radial oil passage 452 for communication between the second radial oil passage 450 and the oil chamber 435. In the present embodiment, the sun gear shaft 392 extends through the cylindrical portion 372b of the first support wall 372 and projects from the cylindrical portion 372b in the axial direction away from the first sun gear S1, and the sun ear shaft 392 and the first rotor support shaft 386 are coupled together through the spline 426, which is located radially inwardly of the bearing 388 disposed adjacent to the cylindrical portion 372b, so that the required wall thickness (in the radial direction) of the cylindrical portion 372b can be made smaller, than in the case where the first rotor support shaft 386 extends into the cylindrical portion 372b, and the first rotor support shaft 386 and the sun gear shaft 392 are coupled together radially inwardly of the cylindrical portion 372b. Accordingly, the axial oil passage 448 and the second radial oil passage 450 can be made comparatively easily.

A brake hub 456 consists of a radially inner cylindrical portion 456a fixedly fitted on the outer circumferential surface of the radially outer cylindrical portion 430c of the clutch cylinder 430, a connecting portion 456b radially extending from an axial end of the radially inner cylindrical portion 456a remote from the first support wall 372, and a radially outer cylindrical portion 456c extending from the radially outer end of the connecting portion 456b in the axial direction opposite to the direction of extension of the radially inner cylindrical portion 456a from the connecting portion 456b. The radially inner cylindrical portion 456a is welded to the radially over cylindrical portion 430c of the clutch cylinder 430, so that the brake hub 456 is fixed in position and rotated with the clutch cylinder 430.

The switching brake B0 includes the above-indicated brake hub 456, a brake cylinder 458 received in the first casing 12a, a brake piston 460 accommodated in the brake cylinder 458, and a plurality of pressure plates 462 and a plurality of friction discs 464 which are forced against each other by the brake piston 460, for frictional contact with each other.

The radial wall portion 372a of the first support wall 372 has a thick-walled radially outer portion extending toward the switching brake B0, and the inner circumferential surface of the first casing 12a has spline teeth 466 formed between the end face of the radial wall portion 372a on the side of the switching brake B0, and the end face of the brake cylinder 458 on the side of the first support wall 372. The plurality of pressure plates 462 are splined to the spline teeth 466. A cylindrical spacer member 468 is interposed between the pressure plate 462 nearest to the first support wall 372, and the first support wall 372. On the other hand, the plurality of friction discs 464 are splined to the outer circumferential surface of the radially outer cylindrical portion 456c of the brake hub 456.

The brake cylinder 458 is held in abutting contact with the end face of the spline teeth 466, and is thus prevented from moving in one of the opposite axial directions, and is prevented by a retainer ring 470 fixed to the first casing 12a, from moving in the other axial direction. The brake cylinder 458 is provided at its open end with a radially extending spring holder plate 472 which is immovable in the axial direction toward the first support wall 372. A return spring 474 is interposed between the spring holder plate 472 and the brake piston 460.

In the present embodiment described above, the power distributing mechanism 16 arranged to distribute the output of the engine 8 to the first electric motor M1 and the power transmitting member 18 is provided with a differential limiting device in the form of the switching clutch C0 and the switching brake B0, which is arranged to place the power distributing mechanism 16 selectively in one of a differential state in which the power distributing mechanism 16 is operable as a differential device, for example, a continuously-variable shifting state in which the power distributing mechanism 16 is operable as an electrically controlled continuously variable transmission the speed ratio of which is continuously variable, and a non-differential state in which the power distributing mechanism 16 is not operable as the differential device, for example, a fixed-speed-ratio shifting state in which the power distributing mechanism 16 is operable as a transmission having fixed speed ratios. Accordingly, the power distributing mechanism 16 is operable in a selected one of power transmitting states. In addition, the power distributing mechanism 16 is placed in the fixed-speed-ratio shifting state when the engine 8 is operating in a high-output region, and is operated as the continuously variable transmission only when the vehicle is in a low-to-medium speed running state or in a low-to-medium output state, so that the amount of electric energy that should be generated by the first electric motor M1, that is, the maximum amount of electric energy to be transmitted from the first electric motor M1 can be minimized, in other words, the electric reaction of the first electric motor M1 can be minimized, whereby the required size of the first and second electric motors M1, M2 can be reduced.

It is also noted that the first rotor support shaft 386 is supported by the casing 12, and the input shaft 14 is supported by the first rotor support shaft 386, while the first sun gear S1 is supported by the input shaft 14, and that the clutch cylinder 430 is integrally fixed to the first sun gear S1, so that the switching clutch C0 is accurately positioned and supported in the radial direction.

The present embodiment is further arranged such that the first rotor support shaft 386 and the sun gear shaft 392 are splined to each other for rotation as a unit. The spline coupling of the first rotor support shaft 386 and the sun gear shaft 392 permits easy connection of these two members, and reduces a thrust force transmitted from the first sun gear S1 to the first rotor 384. In addition, the splined portion 426 at which the first rotor support shaft 386 and the sun gear shaft 392 are coupled to each other is located radially inwardly of the first rotor support shaft 386, so that the required axial dimension of the drive system 10 can be reduced.

Referring to fragmentary cross sectional views of FIGS. 18 and 19, there are shown the drive system 10 constructed according to a fourth embodiment of this invention. Initially, a general arrangement of a portion of the drive system 10 shown in FIG. 18 will be described. As shown in FIG. 18 the casing 12 of the drive system 10 consists of the first casing 12a accommodating the first electric motor M1 and the power distributing mechanism 16, and the second casing 12b accommodating the second electric motor M2 and the automatic transmission 20 not shown in FIG. 18. After the first casing 12a and the second casing 12b are assembled together, the first electric motor M1, power distributing mechanism 16 and second electric motor M2 are arranged in this order of description in the right direction as seen in FIG. 18 (in the direction from the engine side). The first casing 12a, the first electric motor M1 and power distributing mechanism 16 accommodated in the first casing 12a constitute a first unit 640, while the second casing 12b, and the second electric motor M2 and automatic transmission 20 accommodated in the second casing 12b constitute a second unit 570. Coaxially with the casing 12, there are disposed the differential mechanism input shaft 14 and an input shaft 572 of the automatic transmission 20, in the order of description in the right direction as seen in FIG. 18. The input shaft 14 is a member of the first unit 640, while the input shaft 572 is a member of the second unit 570.

Between the first electric motor M1 and the power distributing mechanism 16, there is disposed a first support wall 642 formed integrally with the first casing 12a. Between the power distributing mechanism 16 and the second electric motor M2, there is disposed a second support wall 576 fixed to the casing 12b.

Then, a portion of the drive system 10 shown in FIG. 19 will be described in detail. As shown in FIG. 19, a third support wall 578 is disposed on one side of the second electric motor M2 remote from the first electric motor M1, that is, on the right side of the second electric motor M2 as seen in the figure. The automatic transmission 20 is disposed on one side of the third support wall 578 remote from the second electric motor M2. One end portion of an intermediate shaft 580 is fitted in one end portion of the transmission input shaft 572 remote from the differential mechanism input shaft 14, coaxially with the input shaft 14 and input shaft 572. The intermediate shaft 580 is connected at the other end portion (not shown) to the drive system output shaft 22.

The third support shaft 578 consists of a radially inner cylindrical portion 578a coaxial with the transmission input shaft 572; a connecting portion 578b extending inwardly from one axial end of the radially inner cylindrical portion 578a on the side of the second electric motor M2; a radially outer cylindrical portion 578c which extends from the radially outer end of the connecting portion 578b in the axial direction toward the second electric motor M2 and which has a comparatively large radial wall thickness; and a protruding portion 578d extending from a radially inner part of the connecting portion 578b in the axial direction toward the second electric motor M2. The third support wall 578 has a shoulder portion held in butting contact with a stepped portion of the second casing 12b. Namely, the radially outer cylindrical portion 578c of the third support wall 578 is held at its outer circumferential surface in abutting contact with a first abutting surface 582 in the form of an inner circumferential surface of the second casing 12b. Before the third support wall 578 is fixed to the second casing 12b with screws 584, the radially outer cylindrical portion 578c is slidable at its outer circumferential surface on the first abutting surface 582. Accordingly, the third support wall 578 can be fixedly fitted in the second casing 12b, without a press fit. The third support wall 578 is inserted in the second casing 12b after the intermediate shaft 580, components of the automatic transmission 20 and the input shaft 572 are installed in the second casing 12b. Then, the third support wall 578 and a stator 585 of the second electric motor M2 are fixed to the second casing 12b with the screws 584.

The end face of the radially outer cylindrical portion 578c remote from the second electric motor M2 is held in abutting contact with a first radial surface 586 which extends radially from one end of the first abutting surface 582 remote from the second electric motor M2. Accordingly, the third support wall 578 can be accurately positioned in the axial and radial directions by simply inserting the third support wall 578 such that the outer circumferential surface and the end face of the radially outer cylindrical portion 578c are brought into abutting contact with the first abutting surface 582 and the first radial surface 586, respectively. The transmission input shaft 572 is rotatably supported, at an end portion thereof on the side of the intermediate shaft 580 (namely, remote from the second electric motor M2), by the radially inner cylindrical portion 578a of the third support wall 578, via a bearing 588 which is disposed at the above-indicated end portion of the input shaft 572 and located radially inwardly of the radially inner cylindrical portion 578a. An inner sleeve 589 is fitted in the inner circumferential surface of the radially inner cylindrical portion 578a.

A rotor support shaft 590 of the second electric motor M2 is supported at an end portion on the side of the third support wall 578 by the third support wall 578 via a bearing 593 disposed radially inwardly of the protruding portion 578d. The rotor support shaft 590 and the transmission input shaft 572 are coupled to each other through a spline 593, for rotation as a unit. A stator 585 of the second electric motor M2 is held in abutting contact with an end face of the radially outer cylindrical portion 578c of the third support wall 578, namely, cooperates with the second casing 12b to sandwich the radially outer cylindrical portion 578c of the third support wall 578. Thus, the stator 585 is positioned in the axial direction, and the radially outer cylindrical portion 578c functions as a spacer between the stator 585 and the second casing 12b. The third support wall 578 may be considered to have an integrally formed spacer. The stator 585 and the third support wall 578 are fastened together to the second casing 12b, with screws 584 which extend through the stator 585 and the radially outer cylindrical portion 578c in the axial direction and which are threaded in the second casing 12b. This arrangement permits a smaller number of the required components, easier assembling and a smaller radial dimension of the drive system 10, than an arrangement in which the stator 585 and the third support wall 578 are fixed to the second casing 12b, with respective two sets of screws.

The third support wall 578 has a 1-1 oil passage 594, a 1-2 oil passage 596, a 1-3 oil passage 598 and a 1-4 oil passage 600, for supplying a lubricating oil from a secondary regulator valve not shown. The 1-1 oil passage 594 is formed in the connecting portion 578b, so as to extend in the radial direction, and is held at one end thereof in communication with one end of the 1-2 oil passage 596, and the other end of the 1-2 oil passage 596 is held in communication with one end of the 1-3 oil passage 598. The 1-3 oil passage 598 is formed in the inner circumferential surface of the radially inner cylindrical portion 578a, so as to extend in the axial direction, while the 1-4 oil passage 600 is formed in the radially inner cylindrical portion 578a, so as to extend in the radial direction, such that the 1-4 oil passage 600 is held at one end thereof in communication with the end portion of the 1-3 oil passage 598 remote from the 1-2 oil passage 596, and is open at the other end portion in the outer circumferential surface of the radially inner cylindrical portion 578a.

An outer sleeve 602 is press-fitted on the outer circumferential surface of the radially inner cylindrical portion 578a, and a clutch cylinder 604 of the second clutch C2 is fitted on the outer circumferential surface of the outer sleeve 602. A bushing 606 is interposed between the clutch cylinder 604 and the outer circumferential surface of an end portion of the outer sleeve 602 remote from the connecting portion 578b. A clutch piston 608 is accommodated in the clutch cylinder 604, and cooperates with the clutch cylinder 608 to define therebetween an oil chamber 610.

The outer sleeve 602 has an oil hole 612 formed therethrough in the radial direction in communication with the 1-4 oil passage 600. The lubricating oil is fed to the oil hole 612 through the 1-1 oil passage 594, 1-2 oil passage 596, 1-3 oil passage 598 and 1-4 oil passage 600, and is fed from the oil hole 612 to lubricate the friction plates (not shown) of the second clutch C2 through an oil hole formed through the clutch cylinder 604. The outer sleeve 602 further has an oil groove 614 for supplying a working oil to the oil chamber 610. This oil groove 614 is in communication with oil passages formed through the third support wall 578 as working oil passages in addition to the above-described oil passages 594, 596, 598, 600. The clutch cylinder 604 has an oil hole 616 communicating with the oil groove 614 and the oil chamber 610.

The inner sleeve 589 is fitted in the radially inner cylindrical portion 578a of the third support wall 578, so as to close the 1-3 oil passage 598, and has an oil hole 617 formed therethrough in the radial direction, such that the oil hole 617 is open at one end thereof in the end face of the 1-3 oil passage 598 on the side of the second electric motor M2.

The transmission input shaft 574 has a lubricating passage system consisting of a 2-1 oil passage 618, a 2-2 oil passage 620, a 2-3 oil passage 622, a 2-4 oil passage 623, a 2-5 oil passage 624 (shown in FIG. 18, and a 2-6 oil passage 225. The 2-1 oil passage 618 extends in the radial direction of the input shaft 574, and is held in communication with the 1-3 oil passage 598 through the oil hole 617 formed through the inner sleeve 589. The 2-2 oil passage 620 extends in the axial direction of the input shaft 574, and is held at one end thereof in communication with the 2-1 oil passage 618 and open at the other end in the end face of the input shaft 572 on the side of the differential mechanism input shaft 14. This 2-2 oil passage 620 is supplied with the lubricating oil through the 1-1 oil passage 594, 1-2 oil passage 586, 1-3 oil passage 598, oil hole 617 and 2-1 oil passage 618. The 2-3 oil passage 622 extends in the axial direction of the input shaft 572, and is held at one end thereof in communication with the 2-1 oil passage 618 and open at the other end in the end face of the input shaft 572 on the side of the intermediate shaft 580. The 2-4 oil passage 623 extends in the radial direction of the input shaft 572, and is held at one end thereof in communication with the 2-2 oil passage 620 and open at the other end in the outer circumferential surface of a portion of the input shaft 572 in which the spline 593 is formed. The lubricating oil fed to the 2-4 oil passage 623 through the 2-2 oil passage 620 is further fed through the spline 593 to lubricate the bearing 592 disposed radially outwardly of the input shaft 572. Seal rings 626 are fitted on the outer circumferential surface of the input shaft 572, on the axially opposite sides of the 2-1 oil passage 618. Since the seal rings 626 fitted on the input shaft 572 have a comparatively small diameter, the seal rings 626 produce a comparatively small amount of friction with respect to the input shaft 572 under rotation.

The input shaft 572 has a first working oil passage 627, a second working oil passage 628, etc. in addition to the lubricating oil passages consisting of the oil passages 618, 620, 622, 623, 624 and 625. The first working oil passage 627 extends in the axial direction of the input shaft 572 in parallel with the 2-3 oil passage 622, and is open at one end thereof in the end face of the input shaft 572 on the side of the intermediate shaft 580, like the 2-3 oil passage 622. Accordingly, the 2-3 oil passage 622 and the first working oil passage 627 can be formed simultaneously. The first working oil passage 627 is sealed at its open end with a ball 629. The second working oil passage 628 is open at one end thereof in an oil chamber 632 formed in the back surface of the clutch piston 630 of the first clutch C1.

The intermediate shaft 580 rotatably fitted in the transmission input shaft 572 has an axial lubricating passage 634 which is opposed at one end thereof to the 2-3 oil passage 622, and further has a plurality of radial lubricating passages 636 communicating with the axial lubricating passage 634 and open in the outer circumferential surface of the intermediate shaft 580. The lubricating oil is fed to the components of the automatic transmission 20 through the 1-1 oil passage 594, 1-2 oil passage 596, 1-3 oil passage 598, oil hole 617, 2-1 oil passage 618, 2-3 oil passage 622, axial lubricating passage 634 and plurality of radial lubricating passages 636.

Then, a portion of the drive system 10 shown in FIG. 18 will be described in detail. The first casing 12a has a generally cylindrical shape, and a portion of the first casing 12a in which the power distributing mechanism 16 is accommodated has a substantially constant outside diameter, while a portion of the first casing 12a in which the first electric motor M1 is accommodated has an outside diameter which increases in the axial direction toward the engine 8 (in the left direction as seen in FIG. 18). The first casing 12a is open at its opposite axial ends, and has the above-described first support wall 642 formed as an integral part thereof between the power distributing mechanism 16 and the first electric motor M1. This first support wall 642 includes a radial wall portion 642a in the form of a circular disc extending substantially perpendicularly to the differential mechanism input shaft 14, a cylindrical portion 642b extending from the radially inner end of the radial wall portion 642a in the axial direction toward the first planetary gear set 24, and a protruding portion 642c extending a radially inner part of the radial wall portion 642a in the axial direction toward the first electric motor M1. The cylindrical portion 642b has a central through-hole 643 formed therethrough in the axial direction. The first support wall 642 divides the interior of the first casing 12a into a first accommodating chamber 644 located on the side of the engine 8 and accommodating the first electric motor M1, and a second accommodating portion 646 accommodating the power distributing mechanism 16. The first electric motor M1 is installed into the first accommodating chamber 644 in the right direction as seen in FIG. 18, while the power distributing mechanism 16 is installed into the second accommodating chamber 646 in the left direction.

The first casing 12a has a protruding portion 648 extending in the axial direction of the differential mechanism input shaft 14 toward the engine 8, so that the first accommodating chamber 644 has a substantially constant diameter. A lip plate 650 is fixed to the first casing 12a such that the end face of the radially outer end portion is held in abutting contact with the end face of the protruding portion 648.

The first electric motor M1 consists of a stator 652, a rotor 654, and a rotor support shaft (a hub of the rotor) 656 formed integrally with the rotor 654. The first support wall 642 functions as a support member. Namely, the rotor support shaft 656 is rotatably supported at one end portion thereof by the protruding portion 642c of the first support wall 642 (which is a part of the first casing 12a), via a bearing 658. The rotor support shaft 656 is rotatably supported at the other end portion by the first casing 12a, via a baring 660 functioning as third support means and the lid plate 650 fixed to the first casing 12a.

The first sun gear S1 has an integrally formed sun gear shaft 662 having an end portion which extends through the above-described through-hole 643, into the end portion of the rotor support shaft 656 on the side of the first support wall 642. The transmission input shaft 14 extends through the rotor support shaft 656 and the sun gear shaft 662, coaxially with the first casing 12a, such that the transmission input shaft 14 is rotatable relative to the rotor support shaft 656 and the sun gear shaft 662. The input shaft 14 is fixed at one end thereof to the first carrier CA11, so that the output of the engine 8 (not shown) is transmitted to the first carrier CA1 through the input shaft 14.

To the inner circumferential surface of an axial end portion of the first ring gear R1 of the first planetary gear set 24 which is on the side of the second unit 570, there is fixed an annular plate 664 such that the annular plate 664 is not movable in the axial direction and not rotatable relative to the ring gear R1. This annular plate 664 extends in the radial direction of the differential mechanism input shaft 14, and has a central hole. The first planetary gear set 24 has an output shaft 666 (which is the output shaft of the power distributing mechanism 16), which has a shaft portion 666a axially extending toward the second unit 570, and a flange portion 666b radially extending from one end portion of the shaft portion 666a on the side of the first planetary gear set 24. This flange portion 666b is fixed to the annular plate 664, and the output shaft 666 and the annular plate 654 are rotated as a unit. The output shaft 666 functions as the power transmitting member 18 shown in FIG. 1. The switching clutch C0 is disposed between the first support wall 642 and the first planetary gear set 24, while the switching brake B0 is disposed radially outwardly of the first planetary gear set 24.

The second electric motor M2 consists of the above-described stator 585, a rotor 668, and the above-described rotor support shaft 590 rotated with the rotor 668. The above-described second support wall 576 disposed between the second electric motor M2 and the open end of the second casing 12b (first casing 12a) has a central through-hole 672. The second support wall 576 has a protruding portion 576a which is located radially inwardly of a coil 585a of the stator 585 and which extends in the axial direction toward the rotor 668. A bearing 674 is provided in abutting contact with the inner circumferential surface of the protruding portion 576a.

The second support wall 576 also has a shoulder portion held in abutting contact with a stepped portion of the second casing 12b. Namely, the second support wall 576 has an outer circumferential surface held in abutting contact with a second abutting surface 676 that is an axial portion of the inner circumferential surface of the second casing 12b, which portion is nearer to the open end of the second casing 12b and radially outward of the above-described first abutting surface 582. Before the second support wall 576 is fixed to the second casing 12b with the screws 574, the second support wall 576 is slidable at its outer circumferential surface on the second abutting surface 676. The radially outer cylindrical portion of the second support wall 576 has an end face at its axial end on the side of the second electric motor M2. This end face is held in abutting contact with a second radial surface 678 of the second casing 12b which extends radially inwardly from one end of the second abutting surface 676 on the side of the second electric motor M2. Thus, the second support wall 576 is fitted in the second casing 12b with a high degree of accuracy of axial and radial positioning relative to the second casing 12b, with the outer circumferential surface and end face of the second support wall 576 held in abutting contact with the second abutting surface 676 and the second radial surface 678 of the second casing 12b.

The rotor support shaft 590 is supported at one end portion thereof by the second support wall 576 via the above-described bearing 674. On the other hand, this end portion of the rotor support shaft 590 on the side of the second support wall 576 supports the transmission input shaft 572 via a bearing 680 which is disposed radially inwardly of the bearing 674 and which functions as fourth support means. That is, the end portion of the transmission input shaft 572 on the side of the second support wall 576 is supported by the second support wall 572 via the bearing 680, rotor support shaft 590 and bearing 674. Since the second support wall 576 is accurately positioned in the radial direction, the end portion of the input shaft 572 on the side of the second support wall 572 is also accurately positioned in the radial direction. Further, the other end portion of the input shaft 572 is supported by the third support wall 578 which is accurately positioned in the radial direction, so that the other end portion of the input shaft 572 is also accurately positioned in the radial direction. Accordingly, the input shaft 572 is accurately positioned in the radial direction.

The input shaft 572 extends through the above-described through-hole 672 into the first unit 640, and is splined to the output shaft 666 of the first planetary gear set 24, at an axial portion corresponding to the through-hole 672. Since the output shaft 666 functions as the power transmitting member 18 shown in FIG. 1, the input shaft 72 functions as a second input shaft. The 2-5 oil passage 624 described above is formed so as to extend in the radial direction such that the 2-5 oil passage 625 is held at one end thereof in communication with the 2-2 oil passage 620, with the other end being open to the bearing 680 fitted on the outer circumferential surface of the input shaft 572. The lubricating oil fed to the 2-5 oil passage 624 through the 2-2 oil passage 620 is supplied to the bearing 680 and the bearing 674 located radially outwardly of the bearing 680.

The end portion of the transmission input shaft 572 on the side of the first unit 640 extends into the end portion of the differential mechanism input shaft 14 on the side of the second unit 570, which end portion is supported by the transmission input shaft 572 via a bushing 681 which is disposed radially inwardly of the first sun gear S1 and which is interposed between the input shaft 14 and the input shaft 572. The bushing 681 functions as second support means. Since the input shaft 572 is supported by the second casing 12b via the bearing 680, rotor support shaft 590, bearing 674 and second support wall 576, the end portion of the input shaft 14 on the side of the second unit 570 is supported by the second casing 12b via those members 681, 572, 680, 590, 674 and 576. Further, the differential mechanism input shaft 14 is supported by the rotor support shaft 656 via a bearing 682 which is interposed between the inner circumferential surface of the end portion of the rotor support shaft 656 on the side of the lid plate 650 (that is, remote from the transmission input shaft 572) and the input shaft 14. This bearing 682 functions as first support means. Since the rotor support shaft 656 is supported by the first casing 12a via the bearing 660 and the lid plate 650, the input shaft 14 is supported by the first casing 12a via those members 682, 656, 660 and 650. Thus, the differential mechanism input shaft 14 is supported by the casing 12 at two axial positions, which are spaced apart from each other by a comparatively large distance, so that the input shaft 14 is accurately positioned in the radial direction. Further, since the differential mechanism input shaft 14 is supported at its one end portion by the transmission input shaft 572, as described above, the differential mechanism input shaft 14 and the transmission input shaft 572 are accurately coaxially aligned with each other.

The differential mechanism input shaft 14 has a 3-1 oil passage 683 formed coaxially therewith and open at one end thereof to the 2-2 oil passage 620 formed in the transmission input shaft 572, and a 3-2 oil passage 684 communicating at one end thereof with the 3-1 oil passage 684 and open at the other end in a portion of the outer circumferential surface of the input shaft 14 on which the bearing 682 is fitted. The lubricating oil is fed to the 3-1 oil passage 683 through the 2-2 oil passage 620, to lubricate the bearings 682, 660. It is noted that the bushing 681 also functions as a lubricant seal which assures a sufficient amount of supply of the lubricating oil from the 2-2 oil passage 620 to the 3-1 oil passage 683, without the provision of an exclusive seal.

FIG. 20 is an enlarged view of the portion of the power distributing mechanism 16 shown in FIG. 18. The first sun gear S1 is supported by the differential mechanism input shaft 14 via a bushing 686 interposed between the first sun gear S1 and the input shaft 14. The other end portion of the sun gear shaft 662 formed integrally with the first sun gear S1 extends into the rotor support shaft 656, as described above, and is splined to the rotor support shaft 656 via a spline (splined portion) 688, so that the rotor support shaft 656 and the sun gear shaft 662 are rotated as a unit. A bushing 690 is interposed between the input shaft 14 and the inner circumferential surface of an axial portion of the sun gear shaft 662 which is provided with the spline 688. The sun gear shaft 662 is supported at the end portion on the side of the spline 688 by the differential mechanism input shaft 14 via the bushing 690. Accordingly, the first sun gear S1 and the sun gear shaft 662 formed integrally with the first sun gear S1 are supported by the input shaft 14 via the bushings 686, 690, at two axial positions. Since the input shaft 14 is accurately positioned in the radial direction as described above, the first sun gear S1 and the sun gear shaft 662 are also accurately positioned in the radial direction.

The switching clutch C0 includes a clutch cylinder 692 mounted on the cylindrical portion 642b of the first support wall 642, a clutch piston 694 received in the clutch cylinder 692, and a plurality of pressure plates 696 and a plurality of friction discs 698 which are forced against each other by the clutch piston 694, for frictional contact with each other. The clutch cylinder 692 includes a bottom portion 692a extending in parallel with the radial wall portion 642a of the first support wall 642, a radially inner cylindrical portion 692b axially extending from the radially inner end of the bottom portion 692a and fitted on the cylindrical portion 642b of the first support wall 642, and a radially outer cylindrical portion 642c axially extending from the radially outer end of the bottom portion 6892a. The clutch cylinder 692 and the clutch piston 694 received in the clutch cylinder 692 cooperate with each other to define therebetween an oil chamber 700.

The sun gear shaft 662 includes a radially projecting portion 662a radially extending toward the radially inner cylindrical portion 692b of the clutch cylinder 692. The radially projecting portion 662a has an outer circumferential surface which is located radially outwardly of the first sun gear S1 and which is welded with a weld 702 to the inner circumferential surface of the radially inner cylindrical portion 692b of the clutch cylinder 692 of the switching clutch C0. Thus, the first sun gear S1 formed integrally with the sun gear shaft 662 and the clutch cylinder 692 are formed integrally with each other. Since the first sun gear S1 and the sun gear shaft 692 are accurately positioned in the radial direction as described above, the clutch cylinder 692 is also accurately positioned in the radial direction.

A thrust bearing 704 is provided between a side surface of the radially projecting portion 662a of the sun gear shaft 662 and an end face of the cylindrical portion 642b of the first support wall 642 opposed to the radially projecting portion 662a. A thrust force acting on the first sun gear S1 in the axial direction toward the first electric motor M1 is received by the first support wall 642 through the thrust bearing 704. Since the sun gear shaft 662 and the rotor support shaft 656 are coupled together through the splined portion 688, the thrust force acting on the first sun gear S1 in the axial direction toward the first electric motor M1 is not transmitted to the rotor support shaft 656. A thrust force acting on the first sun gear S1 in the opposite axial direction is received by the differential mechanism input shaft 14 integral with the first carrier CA1, through a thrust bearing 706 interposed between a side surface of the first sun gear S1 and a side surface of the first carrier CA1.

The plurality of pressure plates 696 are splined to the inner circumferential surface of the radially outer cylindrical portion 6920c of the clutch cylinder 692. A retainer ring 708 is fixedly fitted in the inner circumferential surface of the radially outer cylindrical portion 692c, at an axial position between the open end of the clutch cylinder 692 and the pressure plate 696 nearest to the open end. On the other hand, the plurality of friction discs 698 disposed alternately with respect to the pressure plates 696 are splined to the outer circumferential surface of a clutch hub 710 which extends from the radially outer end of the first carrier CA1 in the axial direction toward the clutch piston 694. A radially extending spring holder plate 712 is fitted on the outer circumferential surface of the radially inner cylindrical portion 692b of the clutch cylinder 692, at an axial position corresponding to an open end portion of the clutch cylinder 692 which is located radially inwardly of the clutch hub 710. The spring holder plate 712 is immovable in the axial direction toward the first planetary gear set 24. A return spring 714 is interposed between the spring holder plate 712 and the clutch piston 694.

The first support wall 642 has an oil passage system for supplying a working oil to the oil chamber 700 of the switching clutch C0 constructed as described above. Namely, the radial wall portion 642a of the first support wall 642 has a first radial oil hole 716, and the cylindrical portion 642b of the first support wall 642 has an axial oil hole 718 communicating at one end thereof with the first radial oil hole 716, and a second radial oil passage 720 communicating at one end thereof with the axial oil hole 718 and open at the other end in the outer circumferential surface of the cylindrical portion 642b. The radially inner cylindrical portion 692b of the clutch cylinder 692 has a third radial oil hole 722 for communication between the second radial oil hole 720 450 and the oil chamber 700. In the present embodiment, the sun gear shaft 662 extends through the cylindrical portion 642b of the first support wall 642 and projects from the cylindrical portion 642b in the axial direction away from the first sun gear S1, and the sun ear shaft 662 and the rotor support shaft 656 are coupled together through the spline 688, which is located radially inwardly of the bearing 658 disposed adjacent to the cylindrical portion 642b, so that the required wall thickness (in the radial direction) of the cylindrical portion 642b can be made smaller, than in the case where the rotor support shaft 656 extends into the cylindrical portion 642b, and the rotor support shaft 656 and the sun gear shaft 662 are coupled together radially inwardly of the cylindrical portion 642b. Accordingly, the axial oil hole 718 and the second radial oil hole 720 can be made comparatively easily.

A brake hub 724 consists of a radially inner cylindrical portion 724a fixedly fitted on the outer circumferential surface of the radially outer cylindrical portion 692c of the clutch cylinder 692, a connecting portion 724b radially extending from an axial end of the radially inner cylindrical portion 724a remote from the first support wall 642, and a radially outer cylindrical portion 724c extending from the radially outer end of the connecting portion 724b in the axial direction opposite to the direction of extension of the radially inner cylindrical portion 724a from the connecting portion 724b. The radially inner cylindrical portion 724a is welded to the radially outer cylindrical portion 692c of the clutch cylinder 692, so that the brake hub 724 is fixed in position and rotated with the clutch cylinder 692.

The switching brake B0 includes the above-indicated brake hub 724, a brake cylinder 726 received in the first casing 12a, a brake piston 728 received in the brake cylinder 726, and a plurality of pressure plates 730 and a plurality of friction discs 732 which are forced against each other by the brake piston 728, for frictional contact with each other.

The radial wall portion 642a of the first support wall 372 has a thick-walled radially outer portion extending toward the switching brake B0, and the inner circumferential surface of the first casing 12a has spline teeth 734 formed between the end face of the radial wall portion 642a on the side of the switching brake B0, and the end face of the brake cylinder 726 on the side of the first support wall 642. The plurality of pressure plates 730 are splined to the spline teeth 734. A cylindrical spacer member 736 is interposed between the pressure plate 730 nearest to the first support wall 642, and the first support wall 642. On the other hand, the plurality of friction discs 732 are splined to the outer circumferential surface of the radially outer cylindrical portion 724c of the brake hub 724.

The brake cylinder 728 is held in abutting contact with the end face of the spline teeth 734, and is thus prevented from moving in one of the opposite axial directions, and is prevented by a retainer ring 738 fixed to the first casing 12a, from moving in the other axial direction. The brake cylinder 728 is provided at its open end with a radially extending spring holder plate 740 which is immovable in the axial direction toward the first support wall 642. A return spring 742 is interposed between the spring holder plate 740 and the brake piston 728.

The 2-6 oil passage 625 formed in the transmission input shaft 572 is open at one end thereof in the outer circumferential surface of the transmission input shaft 572, at an axial position corresponding to the end of the input shaft 14 fixed to the first carrier CA1, and is held at the other end in communication with the 2-2 oil passage 620. A 3-3 oil passage 744 is formed from the end portion of the input shaft 14 fixed to the first carrier CA1, to the first carrier CA1. This 3-3 oil passage 744 is open at one end thereof in the inner circumferential surface of the input shaft 14, in alignment with the 2-6 oil passage 625. A pinion shaft 746 fitted in the first carrier CA1 has a 4-1 oil passage 748, a 4-2 oil passage 750 and a 4-3 oil passage 752. The 4-1 oil passage 748 is formed so as to extend in the radial direction of the pinion shaft 74, and is held at one end thereof in communication with the 3-3 oil passage 744. The 4-2 oil passage 750 is formed through the pinion shaft 746 coaxially therewith, and is held at one end thereof in communication with the 4-1 oil passage 748. The 4-3 oil passage 752 is held at one end thereof in communication with the 4-2 oil passage 750, and is open at the other end between two needle bearings 754, 756 interposed between the pinion shaft 746 and the first planetary gear P1. The lubricating oil is supplied to the differential mechanism in the form of the first planetary gear set 24, through the 2-6 oil passage 625, 4-1 oil passage 748, 4-2 oil passage 750 and 4-3 oil passage 752. The input shaft 14 has a 3-4 oil passage 758 and a 3-5 oil passage 760 formed coaxially therewith, at respective axial positions on the respective axially opposite sides of the bushing 681. The lubricating oil is supplied to the first planetary gear set 14 also through the 3-4 oil passage 758 and 3-5 oil passage 760. The lubricating oil which has lubricated the first planetary gear set 24 is used to lubricate the pressure plates 730 and friction discs 732 of the switching brake B0 which is disposed radially outwardly of the first planetary gear set 24.

In the present embodiment, the differential mechanism input shaft 14 is supported by the rotor support shaft 656 of the first electric motor M1 and the transmission input shaft 572 which is a member other than the rotor support shaft 656, so that a span of support of the differential mechanism input shaft 14 can be increased. Accordingly, the input shaft 14 is supported with a higher degree of positioning accuracy. Further, the differential mechanism input shaft 14 is supported by the transmission input shaft 572 via the bushing 681, so that the differential mechanism input shaft 14 and the transmission input shaft 572 are radially aligned with each other with a high degree of accuracy.

While the preferred embodiments of this invention have been described above by reference to the accompanying drawings, it is to be understood that the present invention may be embodied with various changes and modifications.

In the illustrated embodiments described above, the power distributing mechanism 16 is placed selectively in one of its differential state and non-differential state, so that the drive system 10 is switchable between the continuously-variable shifting state in which the drive system is operable as an electrically controlled continuously-variable transmission, and the step-variable shifting state in which the drive system is operable as a step-variable transmission. However, the switching between the continuously-variable shifting state and the step-variable shifting state is one form of the switching between the differential state and the non-differential state of the power distributing mechanism 16. For instance, the power distributing mechanism 16 may be operated as a step-variable transmission the speed ratio of which is variable in steps, even while the power distributing mechanism 16 is placed in the differential state. In other words, the differential state and the non-differential state of the drive system 10 (power distributing mechanism 16) do not necessarily correspond to the continuously-variable shifting state and the step-variable shifting state, respectively, and the drive system 10 need not be switchable between the continuously-variable shifting state and the step-variable shifting state.

In the power distributing mechanism 16 in the illustrated embodiments, the first carrier CA1 is fixed to the engine 8, and the first sun gear S1 is fixed to the first electric motor M2 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the differential mechanism input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and the first electric motor M1 is connected to the first sun gear S1 while the second electric motor M2 is connected to the power transmitting member 18. However, this arrangement is not essential. For instance, the first and second electric motors M1 and M2 may be operatively connected through gears or belts to the first sun gear S1 and the power transmitting member 18, respectively.

Although the power distributing mechanism 16 in the illustrated embodiments is provided with the differential limiting device in the form of the switching clutch C0 and the switching brake B0, the power distributing mechanism 16 may be provided with only one or none of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the drive system 10 in the illustrated embodiments, the switching clutch C0 need not be engaged to establish the neutral position.

The frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch. Where the frictional coupling devices are of a wet-type multiple-disc type, canceling chambers for canceling a centrifugal hydraulic pressure may be provided.

The drive system 10 according to the illustrated embodiments is a drive system for a hybrid vehicle in which the drive wheels 38 can be driven by not only the engine 8 but also the first electric motor or the second electric motor M2. However, the principle of the present invention is applicable to a vehicular drive system in which the power distributing mechanism 16 is not operable in a hybrid control mode, and functions only as a continuously variable transmission so-called an "electric CVT".

In the illustrated embodiments, the power distributing mechanism 16 may be replaced by a differential gear device having a pinion and a pair of bevel gear which mesh with the pinion and which are operatively connected to the first and second electric motors M1, M2 or to the power transmitting member 18.

While the power distributing mechanism 16 in the illustrated embodiments is constituted by one planetary gear set, the power distributing mechanism 16 may be constituted by two or more planetary gear sets which cooperate to function as a transmission having three or more positions when it is placed in the fixed-speed-ratio shifting state.

In the illustrated embodiments, the automatic transmission 20 having the three planetary gear sets 26, 28, 30 is provided as the second gear device or power transmitting device. However, the second gear device may be a speed reducing mechanism having one planetary gear set, as disclosed in Patent Document 1 identified above, or the power transmitting device need not be constructed to perform a shifting action. Where the second gear device is an automatic transmission, the construction of the automatic transmission is not limited to the details of the illustrated embodiments, in the number of the planetary gear sets, the number of the gear positions, and the selective connections of the clutches C and brakes B to the elements of the planetary gear sets.

In the illustrated embodiments, the step-variable automatic transmission 20 is interposed in a power transmitting portion between the power transmitting member 18 (which is the output member of the power distributing mechanism 16) and the drive wheels 38. However, the step-variable automatic transmission 20 may be replaced by another type of power transmitting device such as a continuously variable transmission (CVT), and need not be provided. Where the continuously variable transmission (CVT) is provided, the drive system as a whole is placed in the step-variable shifting state when the power distributing mechanism 16 is placed in its fixed-speed-ratio shifting state. In the step-variable shifting state, the drive force is transmitted primarily through a mechanical power transmitting path, without using an electric path. The continuously variable transmission may be arranged to perform a shifting action to establish a selected one of a plurality of speed ratios which correspond to gear positions of a step-variable transmission and which are stored in a memory. The construction of the step-variable automatic transmission is not limited to the details of the illustrated embodiments, in the number of the planetary gear sets, the number of the gear positions, and the selective connections of the clutches C and brakes B to the elements of the planetary gear sets.

In the illustrated second embodiment of FIGS. 14 and 15, the first support wall 372 functioning as the support member is formed integrally with the casing 12. However, it is possible that the first support wall 372 is formed separately from the casing 12 and fixed to the casing 12 through bolts or other fastening means.

The automatic transmission 20 in the illustrated embodiments includes the three planetary gear sets 26, 28 and 30 disposed between the power transmitting member 18 and the output shaft 22. However, the construction of the automatic transmission is not limited to the details of the illustrated embodiments, in the number of the planetary gear sets, the number of the gear positions, and the selective connections of the clutches C and brakes B to the elements of the planetary gear sets. Further, the automatic transmission 20 may be replaced by a speed reducing mechanism including one planetary gear set, as disclosed in Patent Document 1 identified above. The drive system need not be provided with any automatic transmission or speed reducing mechanism.

In the illustrated fourth embodiment of FIGS. 18-20, the first support all 642 is formed integrally with the casing 12, while the second support wall 576 and the third support wall 578 are formed separately from the casing 12 and fixed to the casing 12 through the bolts 574, 584. However, it is possible that the first support wall 642 is formed separately from the casing 12 and fixed to the casing 12 through bolts or other fastening means, and/or the second support wall 576 or the third support wall 578 is formed integrally with the casing 12.

It is to be understood that the embodiment described above is given for illustrating the present invention and that the invention may be embodied with various other changes and modifications which may occur to those skilled in the art.

The invention claimed is:

1. A vehicular drive system comprising:
a first electric motor, a first gear device, a second electric motor and a second gear device, which are arranged in this order of description, wherein:
said second gear device includes an input shaft which is rotatably supported directly by a support wall disposed between said second electric motor and said second gear device and by a rotor support shaft of said second electric motor, while extending through said rotor support shaft, said input shaft having an axial extension which extends from said second electric motor into a first unit constituted of said first electric motor, said first gear device and a first casing accommodating said first electric motor and said first gear device therein, and at which said input shaft is connected to an output shaft of said first gear device.

2. The vehicular drive according to claim 1, wherein said second electric motor and said second gear device constitute a second unit, and said output shaft of said first gear device and said input shaft of said second gear device are connected to each other, whereby a drive force can be transmitted between said first unit and said second unit.

3. A vehicular drive system comprising:
a first electric motor, a first gear device, a second electric motor and a second gear device, wherein:
said first electric motor, said first gear device and a first casing accommodating said first electric motor and said first gear device therein constitute a first unit, while said second electric motor, said second gear device and a second casing accommodating said second electric motor and said second gear device therein constitute a second unit,
said first gear device includes an output shaft, and said second gear device includes an input shaft which is connected to said output shaft of the first gear device, and said first casing of said first unit and said second casing of said second unit are connected to transmit a drive force between said first unit and said second unit,
wherein said output shaft of said first gear device and said input shaft of said second gear device are connected to each other by spline coupling to each other, and
wherein said output shaft of said first gear device has spline teeth formed on an inner circumferential surface thereof, and said input shaft of said second gear device has spline teeth formed on an outer circumferential surface thereof, said spline teeth of said output shaft of said first gear device and said spline teeth of said input shaft of said second gear device being held in meshing engagement with each other.

4. The vehicular drive system according to claim 1, wherein said support wall has an outer circumferential surface held in abutting contact with an inner circumferential surface of a second casing accommodating said second electric motor and said second gear device therein, and said rotor support shaft of said second electric motor is rotatably supported by said support wall.

5. The vehicular drive system according to claim 4, wherein another support wall is provided on one side of said second electric motor which is remote from said support wall, and said another support wall has an outer circumferential surface held in abutting contact with an inner circumferential surface of said second casing, said rotor support shaft of said second electric motor being rotatably supported by said another support wall.

6. The vehicular drive system according to claim 3, wherein a rotor support shaft of said first electric motor and an input shaft of said first gear device are connected to each other so as to be rotated as a unit,
said vehicular drive system further comprising an input shaft which is disposed radially inwardly of said rotor support shaft of said first electric motor and said input shaft of said first gear device and which is supported rotatably relative to said rotor support shaft of said first electric motor and said input shaft of said first gear device.

7. The vehicular drive system according to claim 1, wherein a rotor support shaft of said first electric motor and an input shaft of said first gear device are connected to each other so as to be rotated as a unit, said vehicular drive system further comprising an input shaft which is disposed radially inwardly of said rotor support shaft of said first electric motor and an input shaft of said first gear device and which is supported rotatably relative to said rotor support shaft of said first electric motor and said input shaft of said first gear device.

8. The vehicular drive system according to claim 3, wherein said first electric motor includes a rotor support shaft which is supported at one end thereof by a wall portion of a casing of the vehicular drive system, and at the other end thereof by a lid plate fixed to said casing so as to close an open end of the casing which is remote from said wall portion.

9. The vehicular drive system according to claim 1, wherein said first electric motor includes a rotor support shaft which is supported at one end thereof by a wall portion of a casing of the vehicular drive system, and at the other end thereof by a lid plate fixed to said casing so as to close an open end of the casing which is remote from said wall portion.

* * * * *